United States Patent [19]

Shinohara et al.

[11] Patent Number: 5,309,190
[45] Date of Patent: May 3, 1994

[54] CAMERA HAVING BLURRING MOVEMENT CORRECTION MECHANISM

[75] Inventors: Junichi Shinohara, Yokohama; Yoshimi Ohno, Kawasaki; Yoshio Serikawa, Ageo; Tohru Nishida, Yokohama, all of Japan

[73] Assignee: Ricoh Company, Ltd., Tokyo, Japan

[21] Appl. No.: 887,136

[22] Filed: May 22, 1992

[30] Foreign Application Priority Data

May 31, 1991 [JP] Japan ................... 3-155245

[51] Int. Cl.$^5$ .................. G03B 1/18; G03B 17/00
[52] U.S. Cl. .................................. 354/195.1
[58] Field of Search ............. 354/795.1, 430, 222

[56] References Cited

U.S. PATENT DOCUMENTS

| | | | |
|---|---|---|---|
| 4,623,930 | 11/1986 | Oshima et al. | 358/222 |
| 5,062,696 | 11/1991 | Oshima et al. | 359/554 |
| 5,109,249 | 4/1992 | Kitajima | 354/430 |
| 5,150,150 | 9/1992 | Enomoto | 354/456 |
| 5,181,056 | 1/1993 | Noguchi et al. | 354/70 |

FOREIGN PATENT DOCUMENTS

| | | |
|---|---|---|
| 63-116511 | 5/1988 | Japan. |
| 1-298311 | 12/1989 | Japan. |
| 1-300221 | 12/1989 | Japan. |

*Primary Examiner*—Michael L. Gellner
*Assistant Examiner*—Nicholas J. Tuccillo
*Attorney, Agent, or Firm*—Oblon, Spivak, McClelland, Maier & Neustadt

[57] ABSTRACT

A camera having a blurring movement correction mechanism comprising: an optical element disposed in an optical path of a photo-taking optical system so as to correct shift of an image formed on a film surface caused by movement of hands holding a camera body. The camera further comprises: a detection unit for obtaining a blurring movement detection data by converting the blurring movement of the camera body to an electric signal; a calculation circuit for calculating blurring movement correction data for correcting the shift of the image formed on the film surface caused by movement of hands holding the camera body; a blurring movement correction actuator for moving the optical element in a necessary direction for correcting the shift of the image on the film surface on the basis of the blurring movement correction data obtained from the calculation circuit; and a noise removing circuit for removing transition output components included in the blurring movement detection data obtained from the detection unit which components are generated at a time when said blurring movement correction actuator is driven.

5 Claims, 20 Drawing Sheets

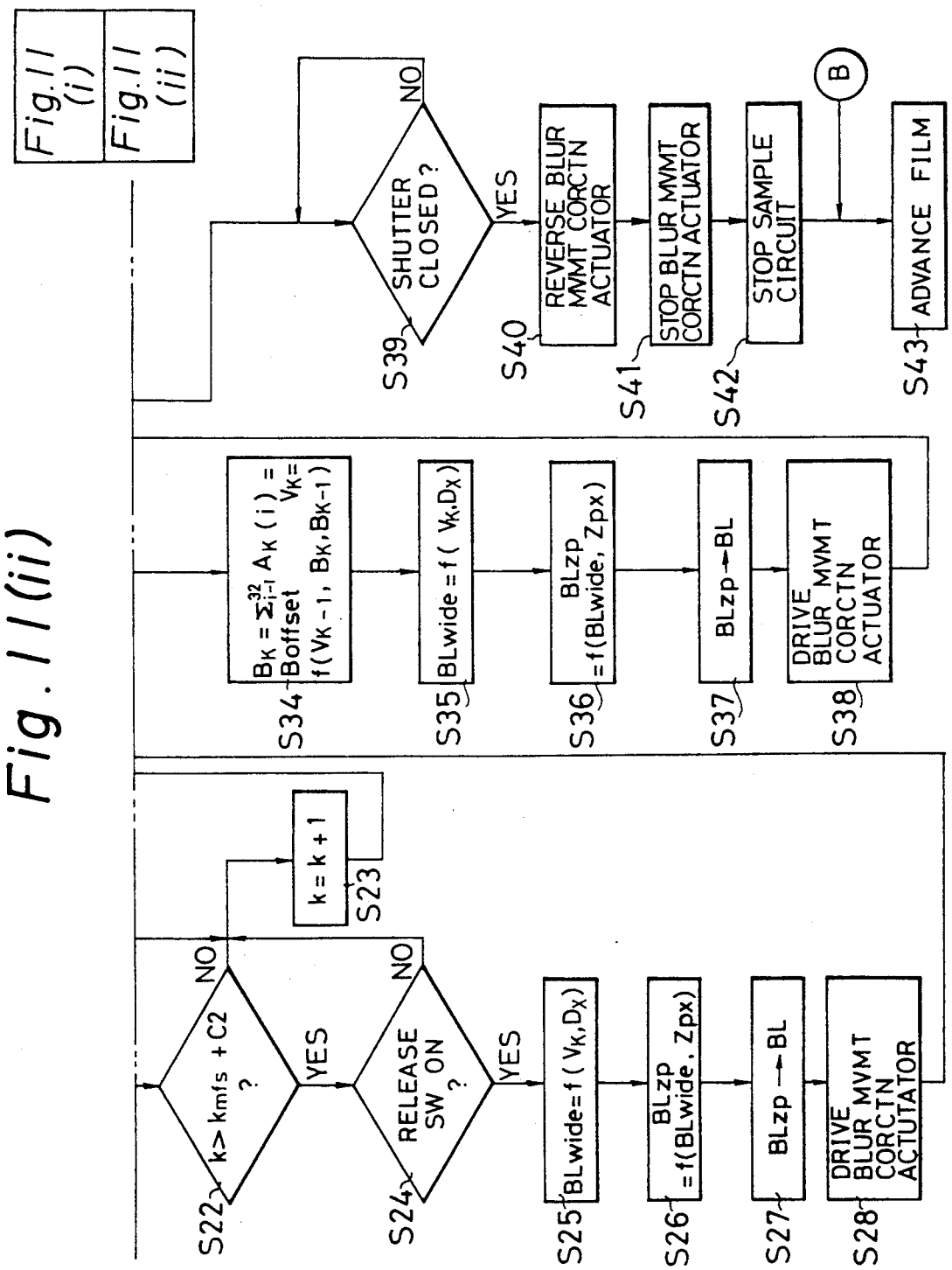

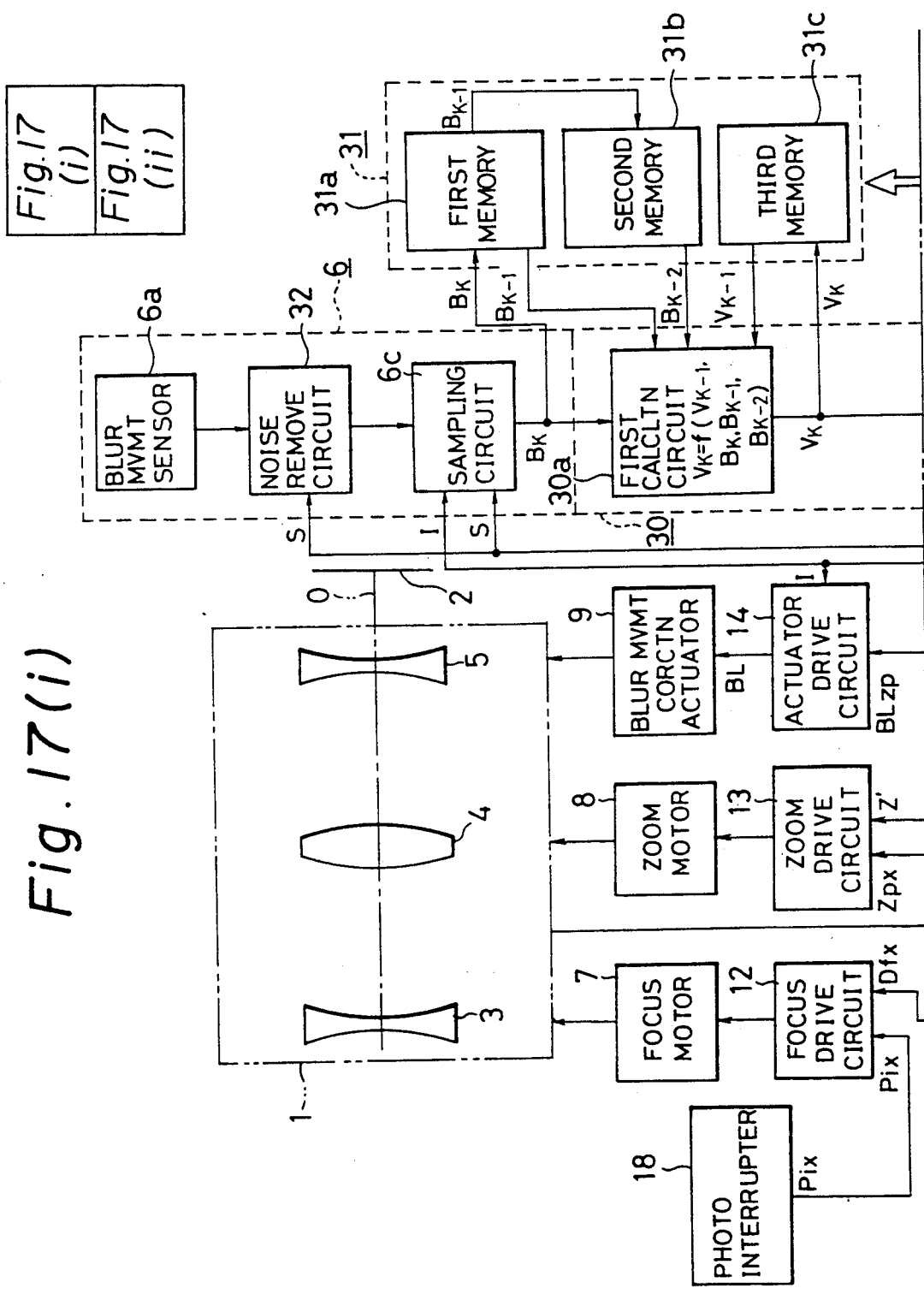

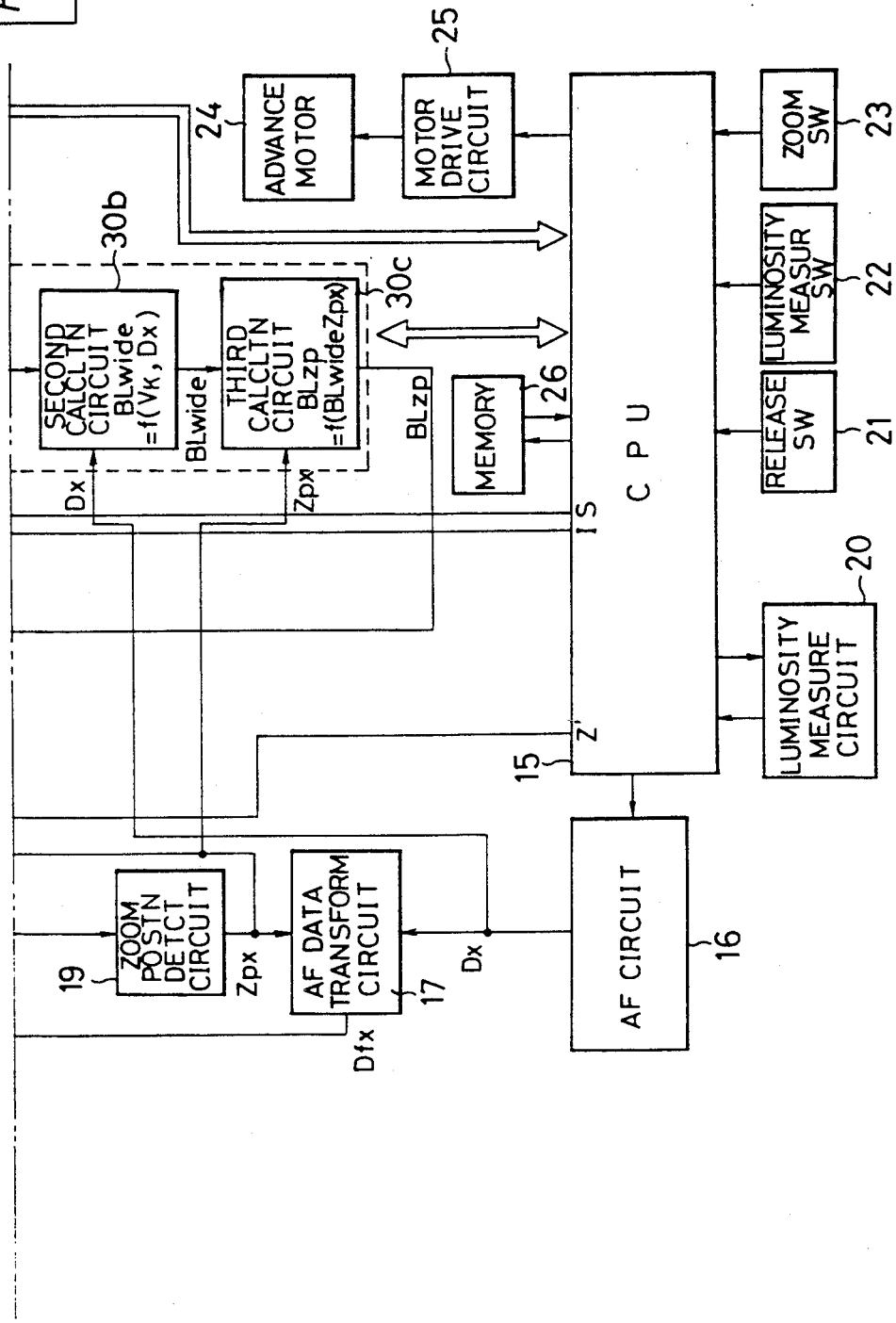

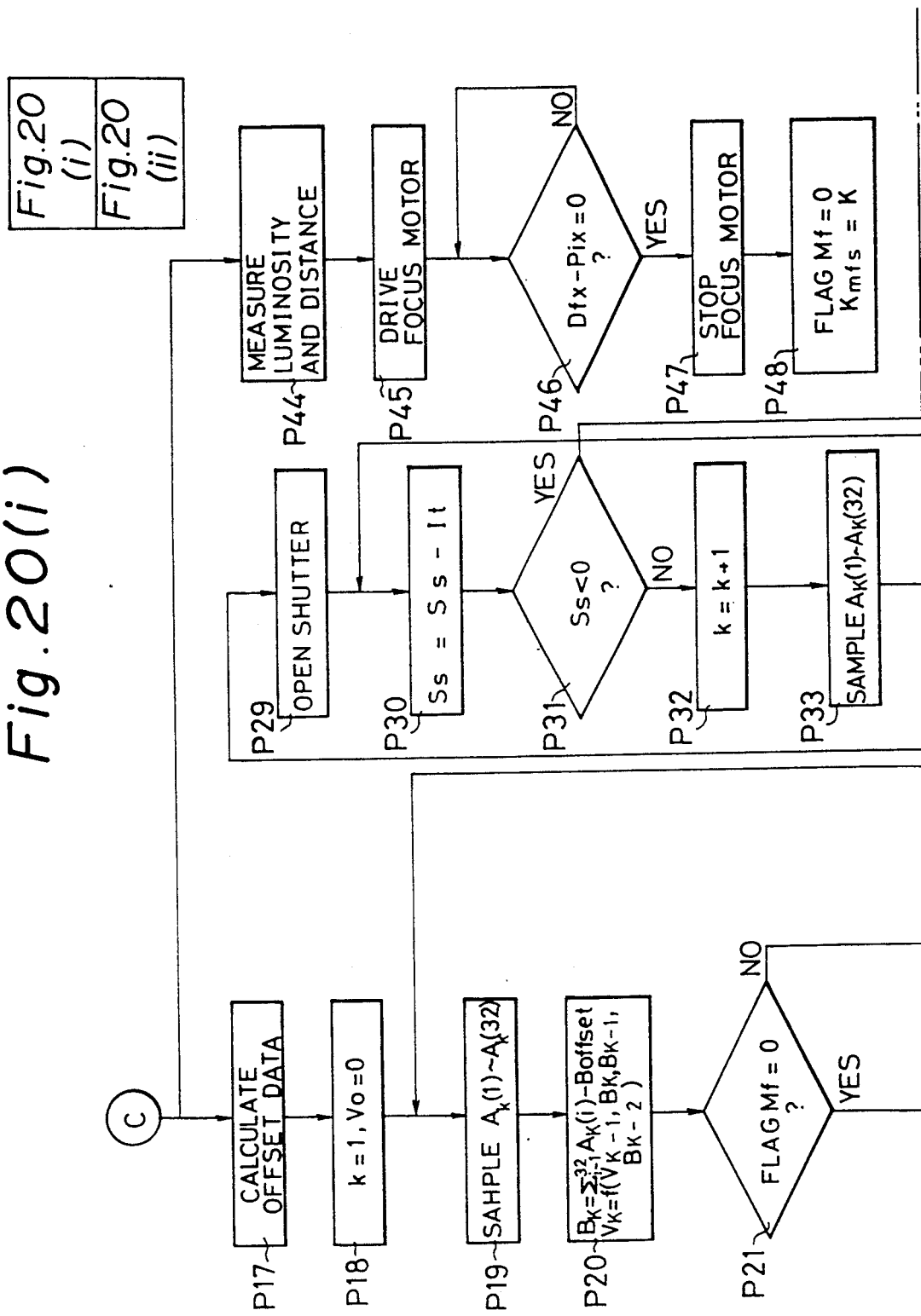

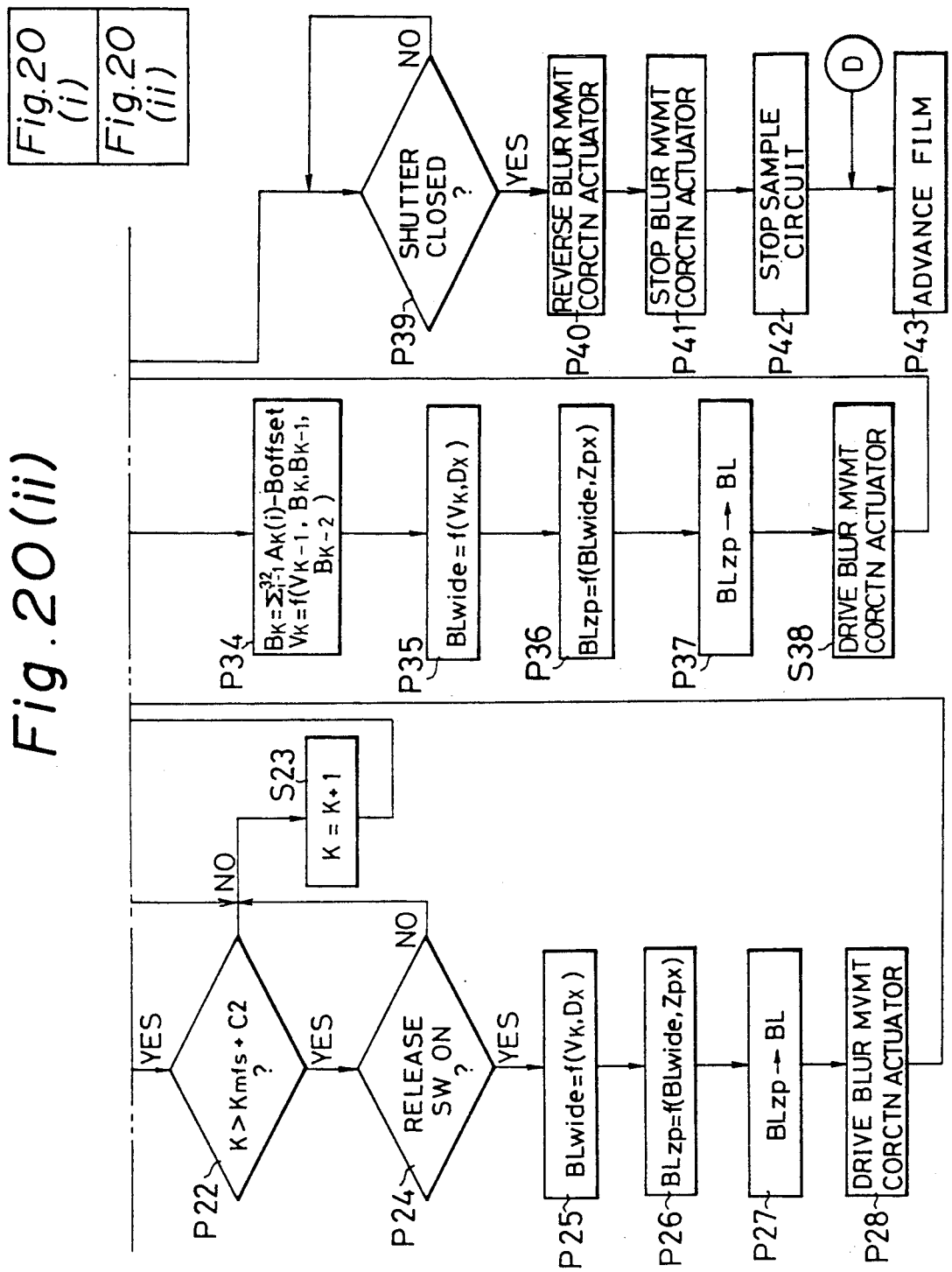

CAMERA HAVING BLURRING MOVEMENT CORRECTION MECHANISM

BACKGROUND OF THE INVENTION

1. Field of the Invention

The present invention relates to a camera having a blurring movement correction mechanism, more precisely, it relates to a camera which is equipped with a correction mechanism that detects unintentional movement of hands holding the camera and that cancels the movement of the image formed on the film surface corresponding to the unintentional motion of hands in response to the detection results of the motion of the camera by driving an optical correction unit which is disposed on an optical path of a fixed focal length optical system or a variable focal length optical system of the camera.

2. Description of the Related Art

In general, a camera having an unintentional blurring movement correction or canceling mechanism (which is called simply a camera hereinafter) is constructed in such a way that, in an example where the camera is provided with a zoom lens as a photo-taking optical system, the photo-taking optical system is detachably arranged in the camera as an integral unit of the camera body or through a lens mount and that a film surface is disposed behind the lens system on an optical axis of the lens system.

The photo-taking optical system comprises a focusing lens group constituted from a plurality of lenses and a zooming lens group constituted from a plurality of lenses. A blurring correction optical element is disposed on an optical path of the lens groups.

The focusing lens group is driven to be in an in-focus state by a focus command signal Df. The zoom lens group is driven to achieve a zooming function by a zoom command signal Dz. Also, the blurring correction lens element is driven to correct or compensate for the blur of photo-image caused by unintentional motion of hands by a blur correction command signal Da.

Next, the functional motion of each lens group is described below. The focusing lens group is driven to move forward according as the focal length is shifted to the telescopic side and according as the length to the subject to be taken is shortened.

The zoom lens group is driven to move forward according as the focal length is shifted toward the telescopic side. Similarly, the blur correction optical element is driven to move forward according as the zoom lens group is driven to move toward the telescopic side.

Next, the blur correction command signal Da is more concretely described below.

The example is the case where the oscillation motion of the camera body caused by unintentional movement of hands has an oscillation characteristic of approximately a sine wave form curve (a) representing an amplitude curve that moves to the positive and negative directions from the boundary of zero level.

To correct blur of a photograph, that is, to minimize or compensate for influence to the subject image on the film caused by unintentional movement of hands holding the camera body that blurs the photograph, the blur correction mechanism of the camera is arranged as follows.

First, a hand movement detection unit arranged within the camera body detects the velocity V of the hand movement within a very short period of time. Then, a movement velocity changing amount data $B_k$ is calculated on the basis of the detected velocity data. The blur (hand movement) correction command signal Da is obtained from the velocity changing amount data $B_k$. The signal Da is used to drive the blur correction optical element to move in the direction in which the motion of the camera caused by the hand movement is canceled so as to prevent the image of the subject on the film surface from moving on the film surface.

The correction motion is always delayed from the actual unintentional motion of the camera.

More precisely, the movement velocity is detected at a plurality of times (t-2It), (t-It), (t), (t+It)..., wherein (It) represents the integration time period for each time to detect the velocity. The velocity changing amount data $B_k$, $B_{k-1}$, ... is calculated on the basis of each velocity detection data. Then, on the basis of each velocity changing amount data $B_k$, $B_{k-1}$, ... is calculated a camera motion velocity data $V_k$, $V_{k-1}$, ... which is used to generate the blur correction command signal Da.

Therefore, the image formed on the film surface moves in accordance with a corrected characteristic (f) which is compensated with the use of correction characteristic (d) with respect to the movement amount characteristic (e).

However, in accordance with the above mentioned correction arrangement, only about one fourth of the total movement amount of the camera body can be corrected.

In order to improve this point of correction amount ratio, an arrangement is proposed wherein the input amount to the drive circuit for the blur correction optical element is controlled so as to converge the oscillation of the movement of the camera body at the time of driving the optical system for correcting the movement of the camera.

Such an arrangement is disclosed in Japanese Patent Application Laying Open (KOKAI) No. 1-300221, for instance. In accordance with the arrangement disclosed in the patent document, the amplifying ratio of the drive circuit for the blur correcting optical element is varied in response to the output from the movement detection unit so that the oscillation movement of the camera body caused by the unintentional movement of hands is attenuated to converge.

Also, the above mentioned patent document discloses another arrangement for attenuating the movement of the camera body with the use of the above mentioned electric means for varying the amplifying ratio of the drive circuit wherein the rigidity of the oscillation detecting sensor for detecting the movement of hands holding the camera body is varied to attenuate the oscillation so as to increase the correction amount ratio of the unintentional oscillation.

On the other hand, it is most desirable to use an actuator which is able to function with a very small or almost no time lag as a drive source for driving the blur correcting optical member in a direction for attenuating and converging the blur movement vibration to zero.

However, in the actual arrangement, from the stand point of space for the actuator assembled within the camera body in connection with the power battery means, the blur correction optical member is driven intermittently by a compact stepping motor, a small sized motor or a linear motor type intermittent drive means.

For instance, the actuator is intermittently driven in every minute time of interval (t0) so as to represent an approximation of curve or linear line of the indicated driving wave-form for driving the actuator.

Also, an example of the timing for the intermittent drive of the actuator is such that a ½ period of the drive pulse Dp, that is, a time period from a rising point to a subsequent falling point of the pulse is arranged to correspond to one cycle of the driving wave-form to drive the actuator synchronized with the drive pulse signal which has a very short repeating time cycle.

Also, another example of the timing for the intermittent drive of the actuator is such that the ½ period of the drive pulse Dp from a rising point to a subsequent falling point is arranged to correspond to one driving cycle of the actuator including one driving wave-form for the actuator and a subsequent short time period represented after the driving wave-form.

Such a curve line of the driving wave-form is processed by sampling detection data at a plurality of timing points so as to obtain a final blurring movement data.

In accordance with the camera of the related art mentioned above, the blurring motion is corrected in such a way that the unintentional motion of hands holding the camera is detected first so that the driving amount for moving the blur correcting optical member is calculated from the detection result and that the optical member is driven on the basis of the calculation result.

However, such an arrangement for driving the blur correcting optical member mentioned above involves in the following problems.

That is, in accordance with the arrangement of the related art mentioned above, a time lag is inevitably generated between the timing points of detecting the blurring movement of hands, calculating the blur correcting data and driving the blur correcting means. Therefore, although it may be possible to correct the blurring movement to a certain extent, the blur is not satisfactorily corrected since a problem of shortage of the correction amount is always involved due to the time lag generated in the blur correcting system.

Such a problem of shortage of the blur correcting amount is not so influential when the absolute amount of the unintentional blurring movement of hands holding the camera is relatively small since the shortage of the blur correcting amount is also small so that the blur can be corrected by the blur correcting system of the related art mentioned above.

However, in the event that the absolute amount of the blurring hand motion becomes large, the shortage of the blur correcting amount becomes large too so that the problem becomes significant.

Also, with regard to the camera of this kind, it is very important to accurately detect the blurring movement of hands holding the camera. For instance, in the case wherein the blurring motion is to be detected with the use of an acceleration sensor type detection means, it is naturally required that the sensitivity of the sensor be high, whereas to the contradiction, if a sensor which is too sensitive is used, the sensor detects minute vibrations generated from the blur correcting optical member at the time of being intermittently operated by the actuator other than the blurring hand motion, as a result of which accuracy of the detection data of the blurring motion is lowered.

This inaccuracy of the detection data is especially significant when the width of the transition noise generated at the time of intermittently driving the blur correcting means is not fully long with respect to the interval of the sampling points of the output data from the blurring motion detection means. That is, the inaccuracy of the detection data is not so influential when the vibration generated from the intermittent drive means is smooth and continuous. However, when the vibration at the time of intermittent drive of the blur correcting means includes a number of impulse components, it becomes difficult to accurately sample the data, which causes to increase the detection error.

SUMMARY OF THE INVENTION

The present invention was made considering the above mentioned points and aiming at solving the problems of the related art mentioned above.

It is therefore an object of the present invention to provide a camera which is able to obviate blurring of the photograph by reliably and appropriately correcting unintentional movement of hands irrespective of the magnitude of the blurring motion not only in the case where the amount of the blurring motion is small but also in the case where the blurring motion amount is very large as well and which camera is also able to accurately correct the blurring movement of hands holding the camera by removing the noise components generated in the camera itself at the time when the blur correcting optical member is being driven.

The above mentioned object of the present invention can be achieved by a camera having blurring movement correction mechanism comprising:

a blurring movement correction optical element disposed in an optical path of a photo-taking optical system so as to correct shift of an image formed on a film surface caused by movement of hands holding a camera body;

a blurring movement detection unit for obtaining a blurring movement detection data by converting the blurring movement of the camera body to an electric signal;

a calculation circuit for calculating blurring movement correction data for correcting the shift of the image formed on the film surface caused by movement of hands holding the camera body;

a blurring movement correction actuator for moving the optical element in a necessary direction for correcting the shift of the image on the film surface on the basis of the blurring movement correction data obtained from the calculation circuit; and a noise removing circuit for removing transition output components included in the blurring movement detection data obtained from the detection unit which components are generated at a time when said blurring movement correction actuator is driven.

In accordance with the present invention, a blur correcting optical member is disposed on an optical path of the photo-taking optical system wherein at the time when the optical member is to be driven to move in the direction for correcting the blurring movement of camera, the blur correcting system is arranged in such a way that a plurality of camera motion velocity data and blurring motion changing data are obtained at a plurality of timing points sampled at regular intervals and that a blurring correction data is predictively calculated on the basis of the velocity data and the blurring motion changing data, which blurring correction data precisely corresponds to the timing point of driving the blur correcting optical member so that the blurring motion is corrected in response to the data.

Therefore, it is an advantage of the present invention that it becomes possible to effectively correct the blurring motion by canceling the blurring motion at the time of driving the blur correcting means irrespective of the magnitude of the hand blurring motion of the photographer and even when the blurring motion is being continuous for some time, as a result of which it becomes possible to take a high quality clear photograph without being blurred.

Besides, the transition noise components which are generated according to the intermittent drive operation are removed, which noise components are detected and included in the output data of the blurring motion detection sensor means. And after the noise components are removed from the blurring motion detection data, the blur correction data to operate the blur correction system are calculated on the basis of the detection data.

Therefore, it is a further advantage of the present invention that it becomes possible to minimize the error component factor so that the accuracy of the blur correcting data is raised, which enables to further effectively correct the blurring movement.

Further objects and advantages of the present invention will be apparent from the following description of the preferred embodiments of the invention as illustrated in the accompanying drawings.

BRIEF DESCRIPTION OF THE DRAWINGS

FIGS. 11, 11(i) and 11(ii) are flow charts of the function of the first embodiment of FIG. 8;

FIGS. 17, 17(i) and 17(ii) are block diagrams of a circuit structure in accordance with the second embodiment of the present invention;

FIGS. 20, 20(i) and 20(ii) are flow charts for explaining the function of the second embodiment of FIG. 17;

DESCRIPTION OF THE PREFERRED EMBODIMENTS

Figure 1:
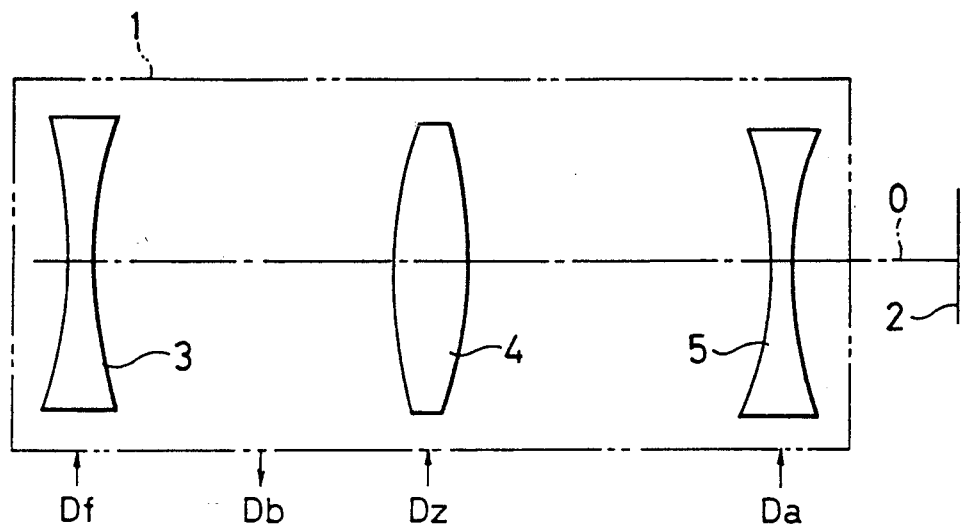
FIG. 1 is an explanatory view of an optical structure of a camera having a blurring movement correcting mechanism to which the present invention can be applied.

Embodiments of the present invention are described in detail with reference to the drawings and in comparison to the related art which is also described referring to the drawings.

In general, a camera having an unintentional blurring movement correction or canceling mechanism (which is called simply a camera hereinafter) is constructed in such a way that, in an example where the camera is provided with a zoom lens as a photo-taking optical system, as illustrated in FIG. 1, the photo-taking optical system 1 is detachably arranged in the camera as an integral unit of the camera body or through a lens mount and that a film surface 2 is disposed behind the lens system on an optical axis (O) of the lens system.

The photo-taking optical system 1 comprises a focusing lens group 3 constituted from a plurality of lenses and a zooming lens group 4 constituted from a plurality of lenses. A blurring movement correcting optical element 5 is disposed on an optical path of the lens groups.

The focusing lens group 3 is driven to be in an in-focus state by a focus command signal Df transmitted from a control circuit (not shown). The zoom lens group 4 is driven to achieve a zooming function by a zoom command signal Dz. Also, the blurring correction lens member 5 is driven to correct or compensate for the blur of photo-image caused by unintentional motion of hands by a blurring motion correcting command signal Da.

Next, the functional motion of each lens group is described below. The focusing lens group is driven to move forward according as the focal length is shifted to the telescopic side and according as the length to the subject to be taken is shortened.

The zoom lens group is driven to move forward according as the focal length is shifted toward the telescopic side. Similarly, the blur correction optical element is driven to move forward according as the zoom lens group is driven to move toward the telescopic side.

Next, the blurring movement correcting command signal Da is more concretely described below.

Figure 2:
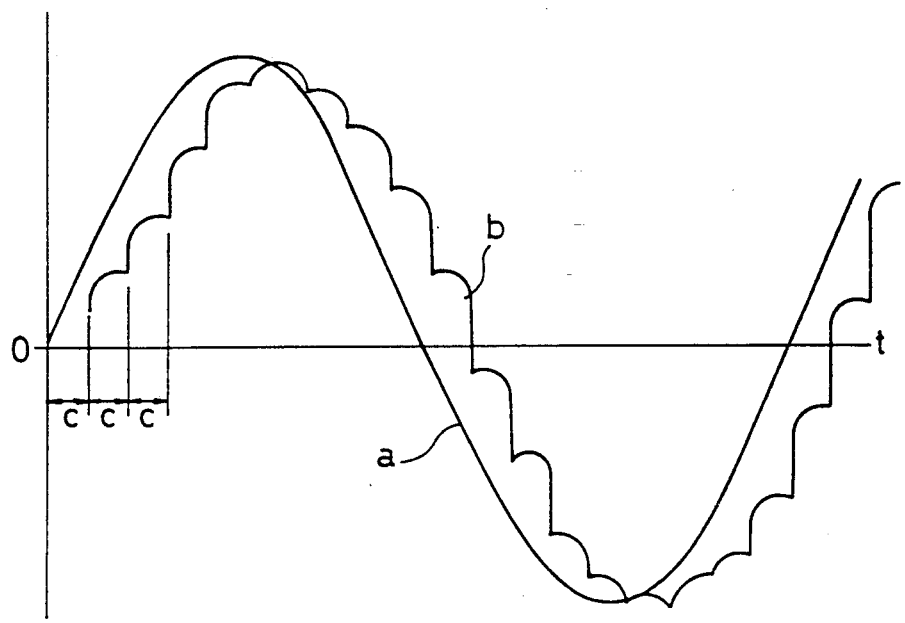
FIG. 2 is a graphical view of the wave-form of blurring movement detection data.

The example is the case where the oscillation motion of the camera body caused by unintentional movement of hands has an oscillation characteristic of approximately sine wave form curve (a) representing an amplitude curve that moves to the positive and negative directions from the boundary of zero level, as illustrated in FIG. 2.

To correct blur of a photograph, that is, to minimize or compensate for influence to the subject image on the film caused by unintentional movement of hands holding the camera body that blurs the photograph, the blur correction mechanism of the camera is arranged as follows.

First, a hand movement detection unit arranged within the camera body detects the velocity V of the hand movement within a very short period of time. Then, a movement velocity changing amount data $B_k$ is calculated on the basis of the detected velocity data. The blur (hand movement) correction command signal Da is obtained from the velocity changing amount data $B_k$. The signal Da is used to drive the blur correction optical element 5 to move in the direction in which the motion of the camera caused by the hand movement is canceled so as to prevent the image of the subject on the film surface 2 from moving on the film surface.

The correction motion is always delayed from the actual unintentional motion of the camera, as represented by the line (b) in FIG. 2.

Figure 3:
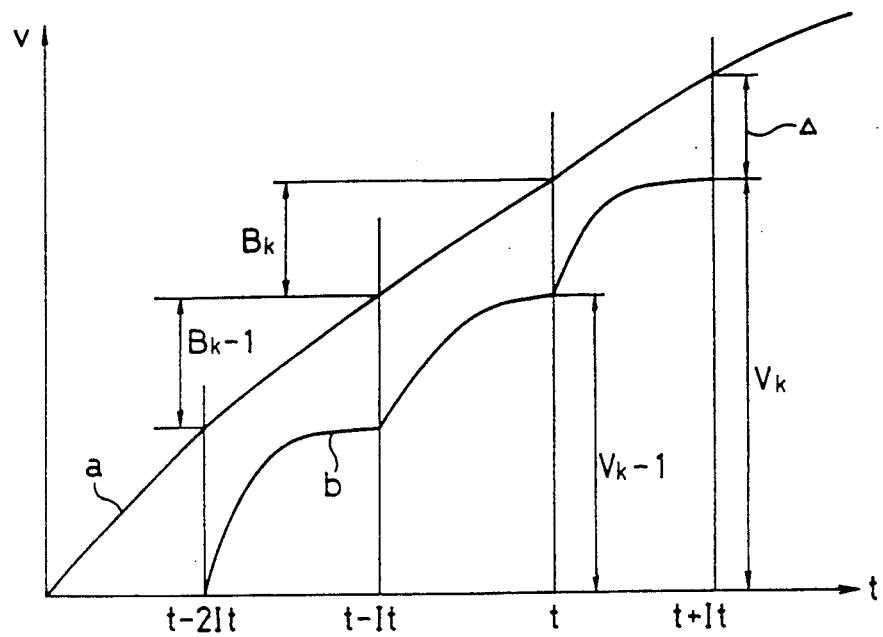
FIG. 3 is a partially enlarged view of the graph of FIG. 2 for explaining the method for obtaining the blur correction data in accordance with the related art.

More precisely, as illustrated in the enlarged view of FIG. 3, the movement velocity is detected at a plurality of times (t-2It), (t-It), (t), (t+It)..., wherein (It) represents the integration time period for each time to detect the velocity. The velocity changing amount data $B_k$, $B_{k-1}$, ... is calculated on the basis of each velocity detection data. Then, on the basis of each velocity changing amount data $B_k$, $B_{k-1}$, ... is calculated a camera motion velocity data $V_k$, $V_{k-1}$, ... which is used to generate the blur correction command signal Da.

Figure 4:
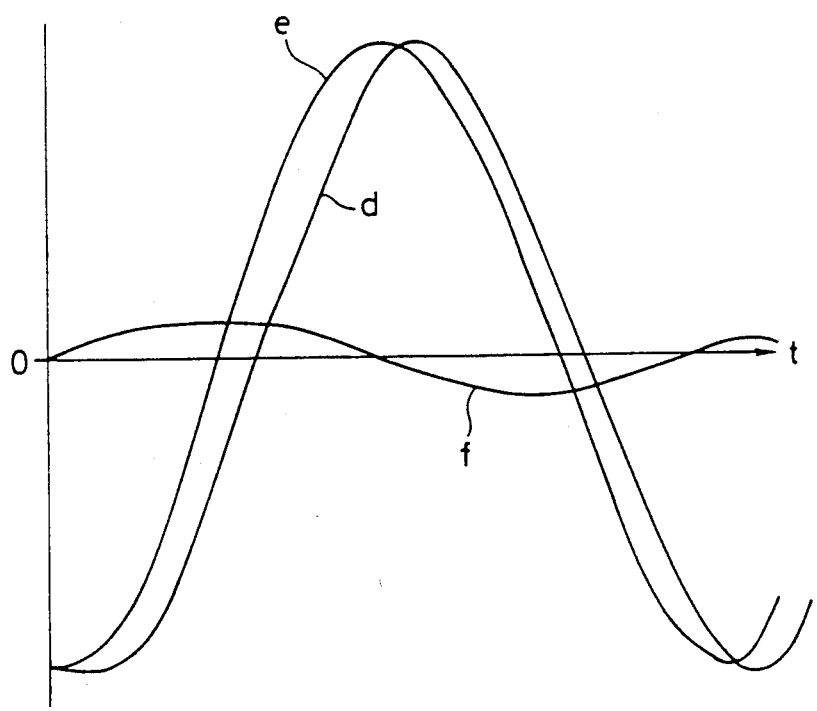
FIG. 4 is a graphical view representing the change of blurring movement in relation to time after the blurring movement is corrected in accordance with the related art.

Therefore, the image formed on the film surface moves in accordance with a corrected characteristic (f) which is compensated with the use of correction characteristic (d) with respect to the movement amount characteristic (e), as illustrated in FIG. 4.

However, in accordance with the above mentioned correction arrangement, only about one fourth of the total movement amount of the camera body can be corrected.

In order to improve this point of correction amount ratio, an arrangement is proposed wherein the input amount to the drive circuit for the blur correction optical element is controlled so as to converge the oscillation of the movement of the camera body at the time of driving the optical system for correcting the movement of the camera.

Such an arrangement is disclosed in Japanese Patent Application Laying Open (KOKAI) No. 1-300221, for instance. In accordance with the arrangement disclosed in the patent document, the amplifying ratio of the drive circuit for the blur correcting optical element is varied in response to the output from the movement detection unit so that the oscillation movement of the camera body caused by the unintentional movement of hands is attenuated to converge.

Also, the above mentioned patent document discloses another arrangement for attenuating the movement of the camera body with the use of the above mentioned electric means for varying the amplifying ratio of the drive circuit wherein the rigidity of the oscillation detecting sensor for detecting the movement of hands holding the camera body is varied to attenuate the oscillation so as to increase the correction amount ratio of the unintentional oscillation.

On the other hand, it is most desirable to use an actuator which is able to function with a very small or almost no time lag as a drive source for driving the blur correcting optical member in a direction for attenuating and converging the blur movement vibration to zero.

However, in the actual arrangement, from the stand point of space for the actuator assembled within the camera body in connection with the power battery means, the blur correction optical member is driven intermittently by a compact stepping motor, a small sized motor or a linear motor type intermittent drive means.

Figure 5:
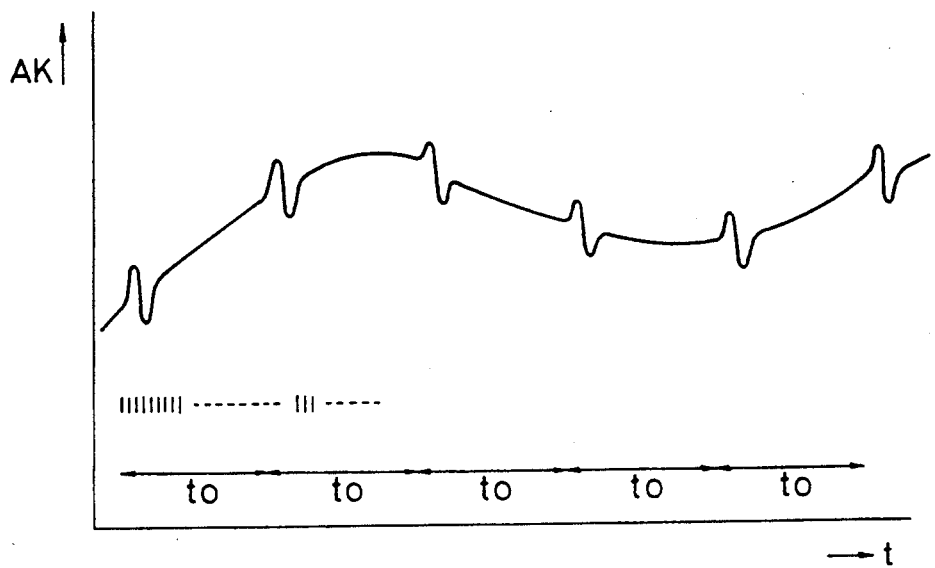
FIG. 5 is a graphical view of an example of a wave-form representing a relation between the drive pulse input to the stepping motor and the output of the blur movement detection sensor.

For instance, as illustrated in FIG. 5, the actuator is intermittently driven in every minute time of interval (t0) so as to represent an approximation of curve or linear line of the indicated driving command wave-form for driving the actuator.

Figure 6:
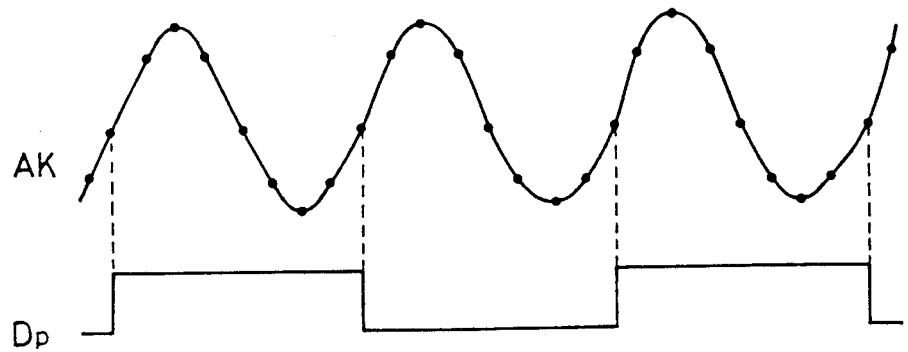
FIG. 6 is a graphical view of another example of the wave-form representing an output signal from the blurring movement detection sensor means in relation to the drive pulse signal when the stepping motor is being driven smoothly.

Also, an example of the timing for the intermittent drive of the actuator is such that, as illustrated in FIG. 6, a ½ period of the drive pulse Dp, that is, a time period from a rising point to a subsequent falling point of the pulse is arranged to correspond to one cycle of the driving wave-form to drive the actuator synchronized with the drive pulse signal which has a very short repeating time cycle.

Figure 7:
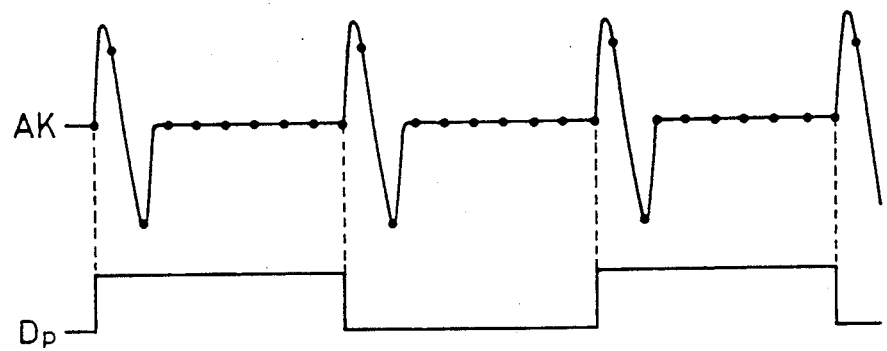
FIG. 7 is a graphical view of still another example of the wave-form representing the output from the blurring movement detection sensor means in relation to the drive pulse signal when the stepping motor is being driven intermittently.

Also, another example of the timing for the intermittent drive of the actuator is such that, as illustrated in FIG. 7, the ½ period of the drive pulse Dp from a rising point to a subsequent falling point is arranged to correspond to one driving cycle of the actuator including one driving wave-form for the actuator and a subsequent short time period represented after the driving wave-form.

Such a curve line of the driving wave-form, as represented in FIG. 5, 6 or 7, is processed by sampling detection data at a plurality of timing points so as to obtain a final blurring movement data. It is to be noted that the sampling points are designated by short linear lines in FIG. 5 and by dots in FIGS. 6 and 7, respectively.

In accordance with the camera of the related art mentioned above, the blurring motion is corrected in such a way that the unintentional motion of hands holding the camera is detected first so that the driving amount for moving the blur correcting optical member is calculated from the detection result and that the optical member is driven on the basis of the calculation result.

However, such an arrangement for driving the blur correcting optical member mentioned above involves in the following problems.

That is, in accordance with the arrangement of the related art mentioned above, a time lag is inevitably generated, as represented by the reference (c) in FIG. 2, between the timing points of detecting the blurring movement of hands, calculating the blur correcting data and driving the blur correcting means. Therefore, although it may be possible to correct the blurring movement to a certain extent, the blur is not satisfactorily corrected since a problem of shortage of the correction amount is always involved due to the time lag generated in the blur correcting system.

Such a problem of shortage of the blur correcting amount is not so influential when the absolute amount of the unintentional blurring movement of hands holding the camera is relatively small since the shortage of the blur correcting amount is also small so that the blur can be corrected by the blur correcting system of the related art mentioned above.

However, in the event that the absolute amount of the blurring hand motion becomes large, the shortage of the blur correcting amount becomes large too so that the problem becomes significant.

Also, with regard to the camera of this kind, it is very important to accurately detect the blurring movement of hands holding the camera. For instance, in the case wherein the blurring motion is to be detected with the use of an acceleration sensor type detection means, it is naturally required that the sensitivity of the sensor be high, whereas to the contradiction, if a sensor which is too sensitive is used, the sensor detects minute vibrations generated from the blur correcting optical member at the time of being intermittently operated by the actuator other than the blurring hand motion, as a result of which accuracy of the detection data of the blurring motion is lowered.

This inaccuracy of the detection data is especially significant when the width of the transition noise generated at the time of intermittently driving the blur correcting means is not fully long with respect to the interval of the sampling points of the output data from the blurring motion detection means. That is, the inaccuracy of the detection data is not so influential when the vibration generated from the intermittent drive means is smooth and continuous, as illustrated in FIG. 6. However, when the vibration at the time of intermittent drive of the blur correcting means includes a number of impulse components, as in the case illustrated in FIG. 7, it becomes difficult to accurately sample the data, which causes to increase the detection error.

The embodiments of the present invention described below obviate the problems of the related art mentioned above.

Figure 8I:
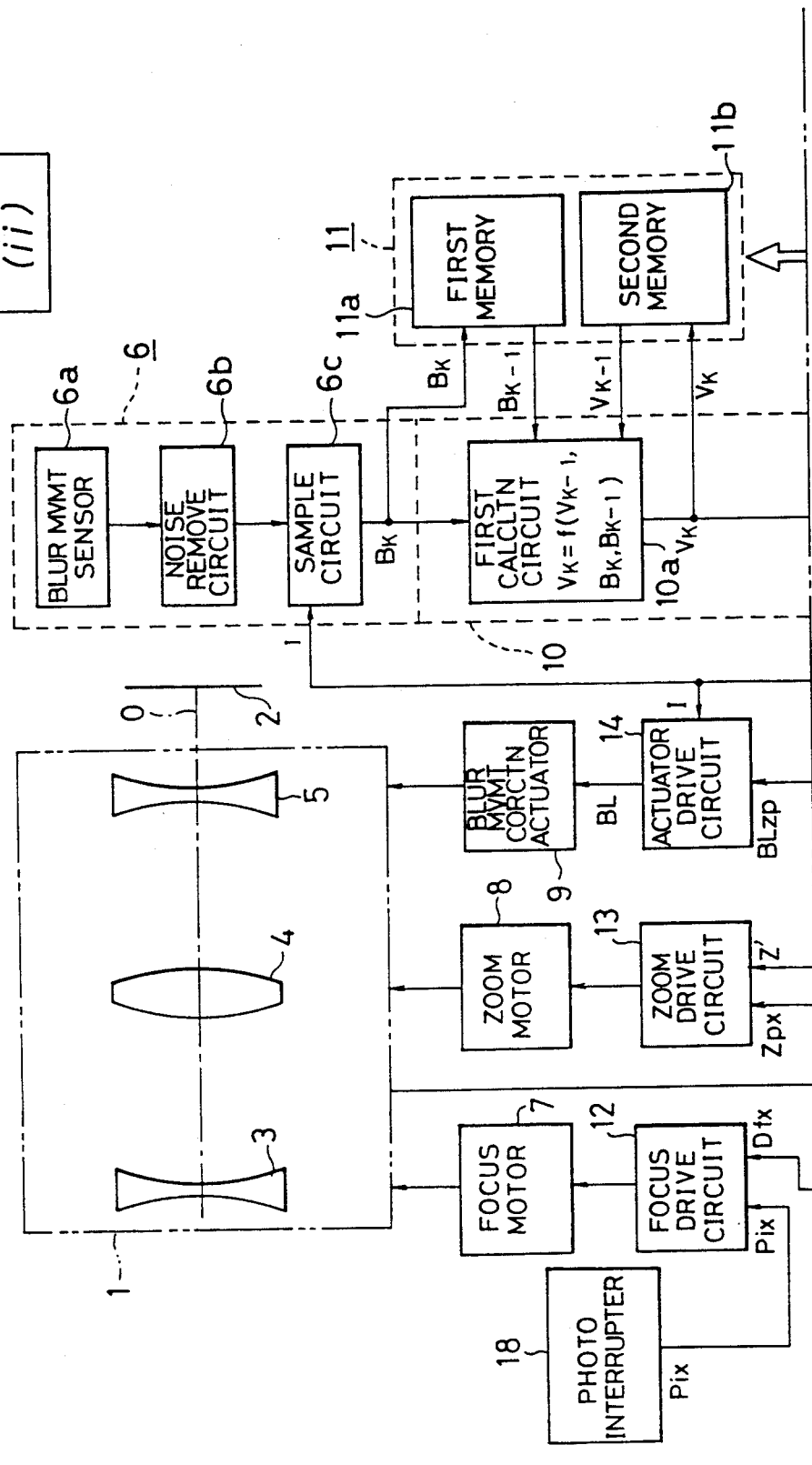
FIGS. 8, 8(i) and 8(ii) are block diagrams of a circuit structure of the camera in accordance with the first embodiment of the present invention.
Figure 8:
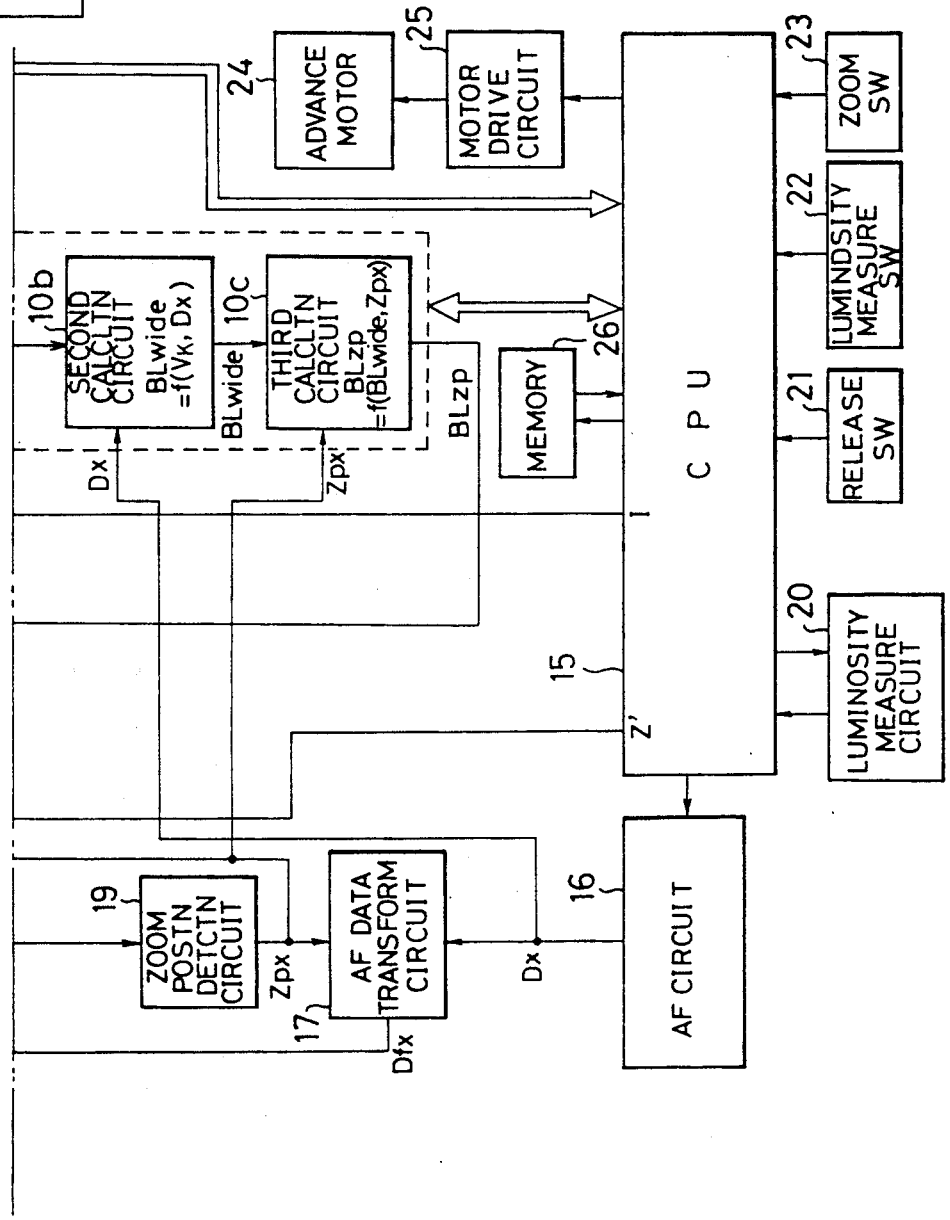

FIG. 8 illustrates a block diagram of the electric circuit of the blurring movement correction mechanism in accordance with a first embodiment of the present invention.

A film surface 2 is positioned on an optical axis (O) of a photo-taking optical system 1 which is detachably arranged in a camera body as an integral structure forming one unit with the camera body as is the case of a compact handy camera or through a lens mount.

The optical system 1 comprises a focussing lens group 3 constituted from a plurality of lenses, a zoom lens group 4 constituted from a plurality of lenses and a blurring movement correcting optical element 5 for correcting the position of the optical axes of the lens groups 3 and 4 in response to the unintentional movement of hands holding the camera.

In the camera body is arranged a blurring movement detection unit 6. The unit 6 is constituted from a blurring movement sensor 6a, a noise removing circuit 6b for removing noise components from the output of the sensor 6a and a sampling circuit 6c for sampling the data from the output of the sensor 6a. The sensor 6a comprises a semiconductor acceleration sensor, for instance. The circuit 6c samples the outputs from the sensor 6b at predetermined intervals of time period, for example.

Also, the noise removing circuit 6b is constituted from a low-pass filter which allows to pass only a low band frequency of about 1 to 10 Hz of the vibration components included in the blurring movement vibration and interferes the frequency components from several KHz to several 10 KHz of the vibration which is generated from the blurring movement correction actuator 9 composed of a stepping motor at the time of intermittent driving operation. The sampling circuit 6c samples the data at a predetermined regular interval.

On the other hand, the lens groups 3 and 4 are equipped with a focussing motor 7 and a zooming motor 8 for electrically moving the focus system for focussing operation and the zoom system for zooming operation, respectively. Also, the optical element 5 is equipped wit a blurring movement correction actuator 9 for driving the optical element 5 to move in the direction perpendicular to the optical axis (O) or incline with respect to the optical axis.

Also, the output terminal of the sensor 6a is connected to the input terminal of the sampling circuit 6c through the noise removing circuit 6b. The output terminal of the circuit 6c, that is, the output terminal of the detection unit 6 is connected to the input terminal of a calculation means 10. A memory means 11 is connected to the calculation means 10.

Further, a focus drive circuit 12 is connected to the motor 7, a zoom drive circuit 13 is connected to the motor 8 and an actuator drive circuit 14 is connected to the actuator 9, respectively.

Also, a CPU 15 is arranged for transmitting a command to control each portion installed within the camera body in relation to the other portions. To this CPU 15 is connected an AF circuit 16 which measures the distance to the subject and automatically drives the optical system to be in an in-focus state.

The output terminal of the AF circuit 16 which transmits the data Dx of the distance to the subject is connected to a first input terminal of an AF data converter circuit 17. An output terminal of the circuit 17 which outputs the focus drive data Dfx is connected to a first control terminal of the focus drive circuit 12.

To a second control terminal of the circuit 12 is connected an output terminal of a photointerrupter 18 which generates a pulse number data Pix in response to the rotation of the focus motor 7.

On the other hand, the photo-taking optical system 1 is equipped with a zoom position detection circuit 19 which detects the position of the zooming lens group 4 being now positioned for obtaining a zoom position data Zpx. An output terminal of the circuit 19 which outputs the data Zpx is connected to a second control terminal of the AF data converter circuit 17 and to a first control terminal of the zoom drive circuit 13 as well. To the second control terminal of the circuit 13 is connected an output terminal of the CPU 15 which outputs a zoom drive amount data Z'.

Also, a luminous detection circuit 20 is connected to the CPU 15 so that a desired control of the measurement of the luminous intensity can be achieved. Further, to the input terminals of the CPU 15 are connected a release switch 21 for actuating the release, a luminosity measurement switch 22 for starting the measurement operation of luminous intensity and a zooming switch 23 for starting the zooming operation, respectively.

Further, a feed motor 24 is arranged for driving a series of function of rolling up film and shutter charge. The rotation of the motor 24 is controlled by a feed command signal transmitted from the CPU 15 through a feed drive circuit 25 which is connected to the output terminal of the CPU 15.

Numeral 26 designates a memory means for temporarily registering necessary data for executing a predetermined program by the CPU 15 and other control sequences as well.

The calculation means 10 is essentially constructed from three calculation circuits, i.e., a first circuit 10a, a second circuit 10b and a third circuit 10c, connected in series in this order. The memory means 11 comprises a first memory 11a and a second memory 11b.

The first calculation circuit 10a calculates $V_k = f(V_{k-1}, B_k, B_{k-1})$, wherein $V_k$: velocity data of camera motion at this time of operation $V_{k-1}$: velocity data of camera motion at the time of preceding operation $B_k$: data of movement changing amount at this time of operation $B_{k-1}$: data of movement changing amount at the time of preceding operation.

The second calculation circuit 10b calculates the blurring movement correction drive reference data BLwide on the basis of the data $V_k$ obtained from the first circuit 10a and the distance data Dx output from the AF circuit 16. The drive reference data is represented as follows.

$$BLwide = f(V_k, Dx)$$

The third calculation circuit 10c calculates the blurring movement correction amount data BLzp on the basis of the data BLwide obtained from the second circuit 10b and the zoom position data Zpx obtained from the circuit 19. The blurring movement correction amount data is represented as follows.

$$BLzp = f(BLwide, Zpx)$$

On the other hand, the input terminal of the first memory 11a is connected to the output terminal of the sampling circuit 6c, that is, the output terminal of the movement detection unit 6. The output terminal of the first memory 11a is connected to the first input terminal of the first calculation circuit 10a. To the input terminal of the second memory 11b is connected the output terminal of the first calculation circuit 10a. And the output terminal of the second memory 11b is connected to the second input terminal of the first circuit 10a.

Next, the blurring movement correcting function in accordance with the above mentioned structure of the embodiment of the present invention is described hereinafter.

Figure 9:
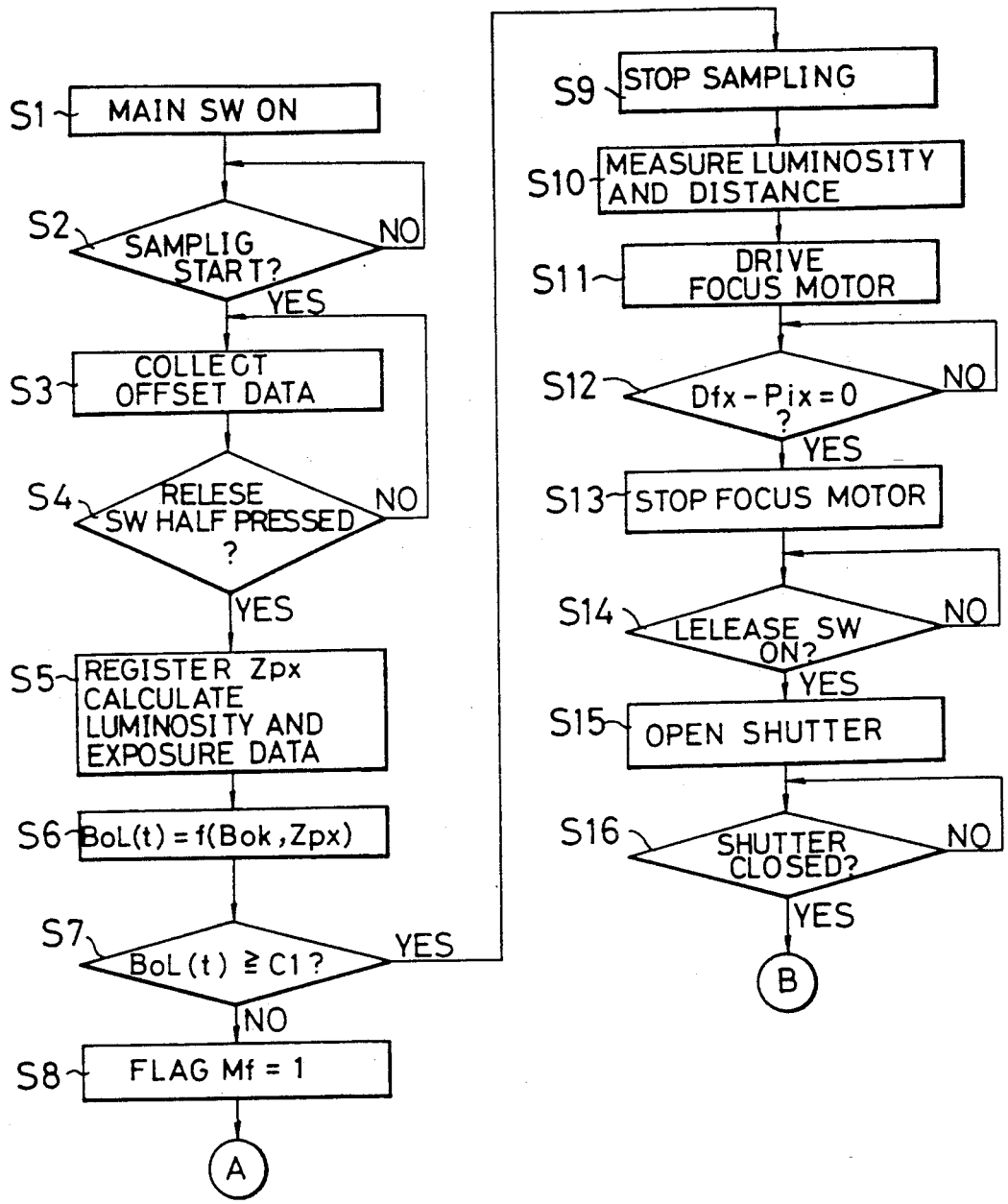
FIG. 9 is a flow chart of the function of the camera of the first embodiment of FIG. 8.

FIG. 9 illustrates a flow chart of the function of the above mentioned embodiment of the present invention.

First, in step S1, a main switch is turned on so that each part of the circuit is supplied with electric power and initialized to be ready for executing a predetermined program registered in the memory 26. Also, a control signal is transmitted from the CPU 15 to the detection unit 6 so that the output data from the sensor 6a is introduced to the noise removing circuit 6b which interferes the vibration frequency components from several KHz to several 10 KHz which are useless for correcting the blurring movement whereby only a frequency band of about 1 to 10 KHz is allowed to pass through the noise removing circuit 6b and be input to the sampling circuit 6b. Then, the sampling circuit 6c starts the sampling function for detecting the blurring unintentional movement.

In the next step S2, whether the sampling operation is started or not is discriminated. If the discrimination result is NO, the system waits until the sampling operation is started.

It is to be noted that the data $B_k$ output from the unit 6 has a dimension of velocity data obtained by integrating the output $A_k$ of the sensor 6a for a predetermined time period (It) at every sampling interval St.

Figure 10:
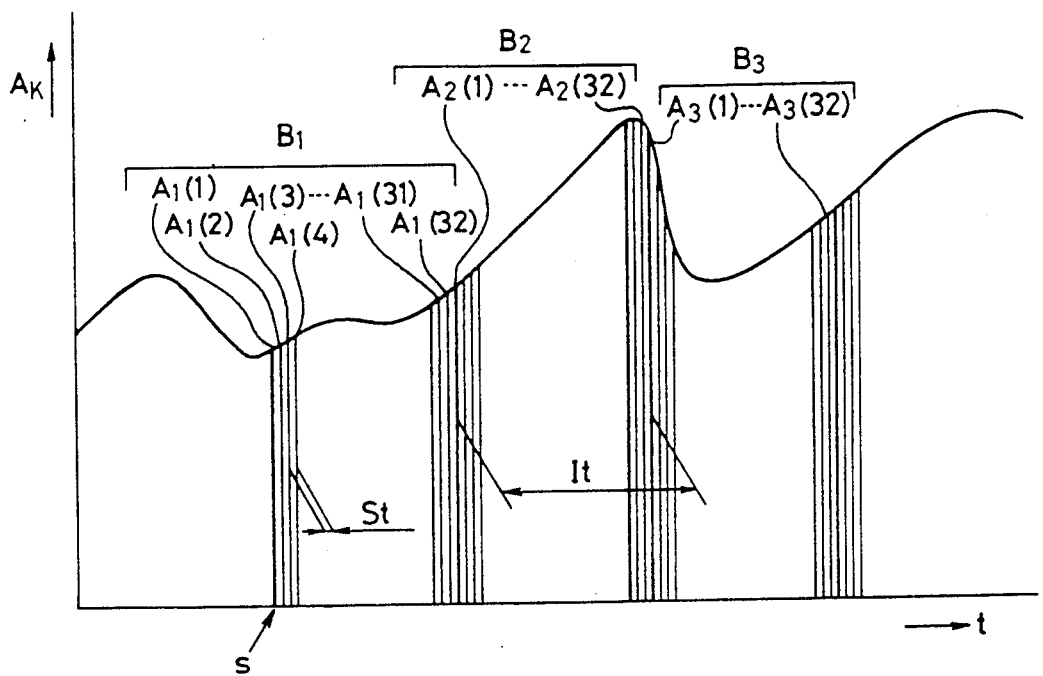
FIG. 10 is a graphical view of a wave-form representing a sampling function of the first embodiment of FIG. 8.

This function is graphically represented in FIG. 10. The output $A_k$ from the sensor 6a is sampled n times, for example 32 times, from the starting point S at minute regular sampling intervals St and integrated for a predetermined time period (It) so that the blurring movement changing amount data is obtained as follows.

(data of first time) $\quad B_1 = \sum_{i=1}^{32} A_1(i)$ (data of second time) $\quad B_2 = \sum_{i=1}^{32} A_2(i)$ (data of $k$th time) $\quad B_k = \sum_{i=1}^{32} A_k(i)$ When such a sampling operation is started and starting of operation is discriminated in step S2, that is, the discrimination result becomes YES in step S2, the flow moves to the subsequent step S3 wherein the offset data are collected.

The reason why the offset data are to be collected is as follows.

The movement changing amount data $B_k$ which corresponds to the unintentional blurring movement of the camera body is obtained from the difference of the movement amount in comparison to the output $A_k$ of the sensor 6a in the condition where the acceleration is zero. Therefore, it becomes necessary to subtract the offset data Boffset represented as follows from each of the plurality of the output data $B_1, B_2, \ldots, B_k$.

(data of first time) $\quad B_1 = \sum_{i=1}^{32} A_1(i) - B\text{offset}$ (data of second time) $\quad B_2 = \sum_{i=1}^{32} A_2(i) - B\text{offset}$ (data of $k$th time) $\quad B_k = \sum_{i=1}^{32} A_k(i) - B\text{offset}$ The offset data are obtained as mentioned above. After that, the flow moves to the next step S4 wherein whether the release button is half pressed or not is discriminated. If the discrimination result is NO, the flow moves back to step S3. On the other hand, if the discrimination result in step S4 is YES, the flow moves to the next step S5.

In step S5, the zoom position data Zpx obtained from the circuit 19 is registered and the luminosity measurement circuit 20 is driven upon receipt of command from the CPU 15 so that the luminosity measurement and exposure value calculation are started.

After that, in the subsequent step S6, a data BoL(t) for checking the magnitude of the movement is calculated as BoL(t)=f(Bok, Zpx) from the check data Bok and the zoom position data Zpx.

After that, in the next step S7, whether the data BoL(t) is equal to or larger than a predetermined reference data C1 or not is discriminated. If the discrimination result is NO, the flow moves to the subsequent step S8 wherein a flag Mf which represents that the motor 7 is being rotating is set as "1". After that, the flow moves to step S17 and step S44 in the flow chart of FIG. 10 which steps are conducted in parallel to each other simultaneously.

On the other hand, if the discrimination result in step S7 is YES, the situation is considered as that the photographer is intentionally moving the camera body aiming at taking a subject which is moving at a high speed, for instance, since the movement amount is too large to correct. Therefore, in this case, the blurring movement correcting operation is not conducted and the flow moves to step S9.

In step S9, a sampling prohibit signal I is transmitted to the sampling circuit 6c of the detection unit 6 from the CPU 15 so that the operation of sampling the data is stopped. After that, the flow moves to subsequent step S10 wherein the luminosity and distance are measured to photograph the subject.

In this step, the data Dx of distance to the subject obtained from the AF circuit 16 is input to the AF data converter circuit 17 which calculates the focus drive data Dfx by combining the data Dx and the data Zpx obtained from the zoom position detection circuit 19, as described later in detail.

In the next step S11, the focus motor 7 is started to be driven to rotate.

After that, in the next step S12, whether Dfx−Pix=0 or not is discriminated.

This discrimination means that at the time of actual focusing drive motion, the data Dfx is compared to the accumulated step number data Pix which is generated from the photo-interrupter 18 each time the motor 7 is driven by one step. That is, whether the motor 7 was driven by the step number necessitated for the focusing motion or not is discriminated in this step S12, more concretely.

If the discrimination result is NO in step S12, the motor 7 is continued to be driven step by step until the discrimination result becomes YES when it is discriminated as that the focusing motion is ended. Then, the motor 7 is stopped in step S13.

In the next step S14, whether the release switch 21 is turned on or not is discriminated. If the discrimination result is NO, the flow waits until the discrimination result becomes YES and flow moves then to step S15.

In step S15, the shutter is opened so that the film is exposed.

In the next step S16, whether the shutter is closed or not is discriminated. If the discrimination result is NO, the flow waits until the discrimination result becomes YES when the exposure of the film is ended and the flow moves to step S43 represented in the flow chart of FIG. 10.

In step S43, the feed motor 24 is driven through the drive circuit 25 so that the film is advanced and the shutter charging operation is conducted for the next film exposure process.

On the other hand, in the case where the discrimination result in step S7 mentioned above is NO, which means that the amount of the movement of hands is less than a predetermined value, the focus motor flag Mf is set to be "1" in the next step S8.

After that, the flow moves to a first sequence group of steps S17 to S43 and a second sequence group of steps S44 to S48, which first and second sequence groups are conducted in parallel to each other.

The first sequence group is described first. In step S17, the offset data is calculated in such a way that the sampling data are obtained by collecting the offset data obtained in step S3 and that the sampling data are averaged to obtain the offset data Boffset which is the averaged value.

After that, the flow moves to step S18 wherein the value of k and Vo is set as k=1 and Vo=0 wherein k represents the number of times of sampling which is conducted 32 times in total and Vo represents data of the above mentioned camera motion velocity data $V_k$ for the first time of operation.

The reason why the value Vo is set as Vo=0 is that the camera motion velocity data $V_k$ of immediately before the series of the movement detection process for correcting the unintentional movement is started is useless as the reference data for obtaining the data for movement correcting operation since the attitude or direction of the camera and the state of being held by hands are not necessarily the same as those at the time of correcting operation being conducted now.

After that, in the next step S19, the data Ak(1) to Ak(32) are sampled at the 32 points.

In the next step S20, the movement change amount data $B_k$ is calculated from the following equation.

$$B_k = \sum_{i=1}^{32} A_k(i) - Boffset$$

Also, in step S20, the data $V_k$ is obtained from the following equation.

$$V_k = f(V_{k-1}, B_k, B_{k-1})$$

This calculation is conducted by the first calculation circuit 10a of the calculation means 10. More precisely, the data $V_k$ of this time of operation is calculated first on the basis of the data $B_k$ of this time of operation. The data $B_k$ of this time is registered in the first memory 11a. Also, the data $V_k$ of this time is registered in the second memory 11b.

The data $B_k$ of this time registered in the memory 11a is input to the circuit 10a from the memory 11a as the data $B_{k-1}$ of the preceding time of operation at the time when the data $B_k$ of the next time of operation is transmitted to the circuit 10a from the sampling circuit 6c.

Similarly, with respect to the data $V_k$ of this time of operation registered in the second memory 11b, at the time when the data $B_k$ of the next time is transmitted to the circuit 10a from the sampling circuit 6c, the data $B_k$ of this time is input to the circuit 10a from the memory 11b as the data $V_{k-1}$ of the preceding time.

Accordingly, it becomes possible to calculate the data $V_k$ which is represented as follows.

$$V_k = f(V_{k-1}, B_k, B_{k-1})$$

After that, in step S21, it is discriminated whether the focus motor flag Mf is "0" which means that the focus motor 7 is being stopped or not. If the motor 7 is being driven, that is, the discrimination result is NO, the flow moves to step S23 wherein the value k is incremented as $k=k+1$ and the flow moves back to step S19 and after that the steps S19 to S21 are repeated.

In step S21, if the motor 7 is being stopped, that is, the discrimination result is YES, the flow moves to step S22 wherein whether k TM kmfs+C2 (kmfs: value of k at the time of ending the AF operation) or not is discriminated.

The reason why the value of k is discriminated is as follows.

The motor 7 is driven until the optical system becomes in-focus. When the system becomes in-focus, the motor 7 is stopped. Immediately after the motor 7 is stopped, there are motion of the camera due to the shock from stopping of the motor and the detector unit 6 detects this motion of the camera and outputs the detection signal of this motion. If such a detection data of motion due to the shock from stopping the motor 7 is used for predictive calculation of the movement correction amount, reliability of the calculation result is lowered. Therefore, the sampling operation has to be started after a predetermined time has passed when such a motion of the camera is attenuated. Therefore, the detecting operation is kept waiting until the value of k becomes larger than the value k at the time when the AF operation is ended by the number C2, for example 5.

Also, if the discrimination result in step S22 is YES, the flow moves to step S24 in which whether the switch 21 is being turned on or not is discriminated.

If the discrimination result in step S24 is NO, the value of k is incremented in step S23 and the steps S19 to S22 are repeated.

On the other hand, if the discrimination result in step S24 is YES, the flow moves to step S25 in which the data BLwide=$f(V_k, D_x)$ is calculated.

After that, in step S26, the data BLzp=f(BLwide, Zpx) is calculated.

Further, in step S27, the data BLzp is converted to the data BL.

The calculation and conversion processes in the above mentioned steps S25 to S27 are described in more detail below.

First, the relation between the data BLzp output from the calculation means 10 (the third circuit 10c, more precisely) and the focal length of the photo-taking optical system (the data Zpx, more concretely) is such that even if the movement amount of hands is the same, the shift amount of the subject image formed on the film surface becomes large according as the focal length becomes long.

Therefore, on the assumption that the reference zoom position of the photo-taking optical system is arranged in the wide angle side (WIDE) and that the movement correction data at this position is used as the reference movement correction data BLwide, the movement correction amount data BLzp can be represented as follows.

$$BLzp = f(BLwide, Zpx)$$

It is to be noted that if the data Zpx does not have a linear relation with respect to the actual change of the focal length, the data may be calculated by the approximation method with the use of following equations.

$$BLzp = BLwide \times f(Zpx)$$

wherein $f(Zpx) = a_0 + a_1 Zpx$ or $f(Zpx) = a_0 + a_1 Zpx + a_2 Zpx_2$ wherein $a_0$, $a_1$ and $a_2$ are predetermined constant numbers.

Figure 12:
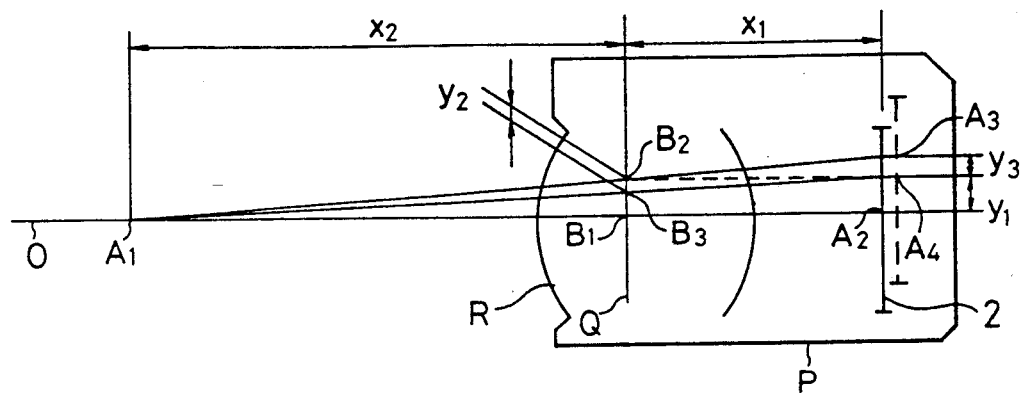
FIG. 12 is an explanatory view representing an optical path for explaining the relation between the blurring movement of hands holding the camera and the change of the image forming position.

The data BLwide and the data $V_k$ satisfy the equation BLwide=$f(V_k, D_x)$ as explained in step S25. The reason why the data Dx is required is explained with reference to FIG. 12 below.

A photo-taking optical system R is constituted from a film 2 disposed at a rear portion in the camera body P and a principal point Q positioned at a front portion in the camera body. When the camera body P moves upward from the optical axis O by the length $y_1$, an image of a subject point $A_1$ on the optical axis O is formed at an intersection point $A_3$ between the film 2 and a line passing through the point $A_1$ and a point $B_2$ which is a point at a length $y_1$ upward from a point $B_1$ which is an intersection point between the optical axis O and the vertical line of the principal point Q.

On the other hand, in the initial position of the camera (the position of the camera before the camera is moved), the image forming point for the subject point $A_1$ is at a point $A_2$ on the film 2 which point $A_2$ is an intersecting point of the optical axis to the film. The point $A_2$ corresponds to a point $A_4$ on the film 2 after the camera is moved, which point $A_4$ is length $y_1$ upward from the point $A_2$. Therefore, by moving the camera body upward by the length $y_1$, the point $A_4$ is moved to the point $A_3$ on the film 2.

Accordingly, it becomes possible to prevent the image forming point on the film 2 from being shifted from the point $A_4$ to $A_3$ when the camera body is moved upward by the length $y_1$, by shifting the photo-taking optical system on the principal point line Q from the point $B_1$ to the point $B_3$ which is the intersection point of the line between the points $A_1$ and $A_4$ to the vertical line Q.

Assuming that the length between the points $B_2$ and $B_3$ is represented by $y_2$, the length from the principal point Q to the film surface 2 is represented by $x_1$ and that the length from the point $A_1$ to the principal point Q is represented by $x_2$, the following equations are satisfied.

$$y_1/(x_1+x_2) = (y_1-y_2)/x_2$$

$$y_2 = (x_1/(x_1+x_2))y_1$$

Therefore, the length $y_2$ is influenced from the length $x_2$ to the subject.

Accordingly, it becomes necessary to use the subject distance data Dx when the camera movement velocity data $V_k$ is transformed to the reference data BLwide for correcting the blurring movement. Therefore, the data BLwide=$f(V_k, D_x)$ is needed, as represented in step S25, mentioned above.

It is to be noted that if the data Dx is not linear with respect to the change of distance $x_2$, an approximate calculation is conducted, as in the case for obtaining the data Zpx by calculation of approximation, with the use of the following equations, instead of doing an accurate calculation with the use of complicated calculation circuits which is undesirable.

$$BLwide = V_k \times f(Dx)$$

wherein $f(Dx) = b_0 + b_1 Dx$ or $f(Dx) = b_0 + b_1 Dx + b_2 Dx_2$ and letters $b_0$, $b_1$ and $b_2$ are predetermined constant numbers.

On the other hand, the data $V_k$ represents the velocity of the image moving on the film surface as mentioned before. If the data $V_k$ is used as it is, the problem of time delay occurs as was described with reference to FIG. 3 before. This can be represented as follows with the use of equations.

$$V_k = \sum_{i=1}^{k} B_i$$

or $$V_k = f(V_{k-1}, B_k) = (V_{k-1}) + B_k$$

Figure 13:
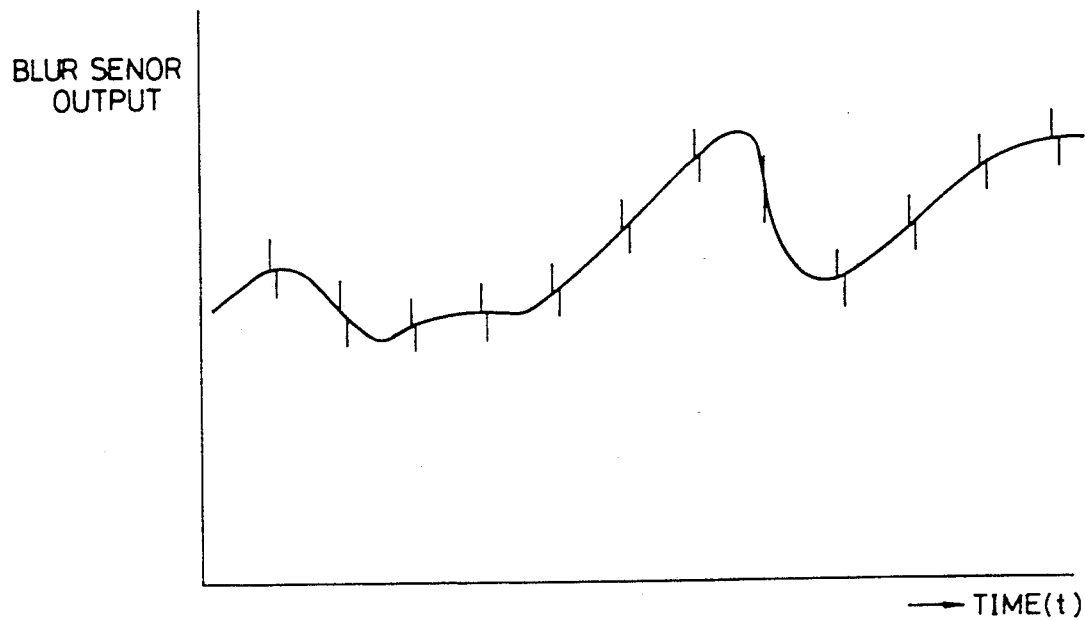
FIG. 13 is a graphical view of a wave-form representing an output from the blurring motion detection sensor of the first embodiment of FIG. 8.

Next, as mentioned before, the output from the sensor 6a is input to the sampling circuit 6c through noise removing circuit 6b. If the output signal from the sensor 6a is represented, as illustrated in FIG. 13, for example, by a wave-form of combination made from components of 1 to 10 Hz frequency of blurring movement vibration and components of several KHz to several 10 KHz frequency of noise signal superposed on the blurring movement, the noise components are removed from the output of the sensor 6a by the circuit 6b so that the blurring movement components are solely transmitted to the sampling circuit 6c.

The above mentioned noise components are generated due to the arrangement in which a stepping motor is adopted as the blurring movement correcting actuator 9 which is intermittently operated by a pulse drive signal of several KHz to several 10 KHz frequency.

Such noise components which are useless for calculating the blurring movement are not input to the sampling circuit 6c, as mentioned above. As a result, it becomes possible to accurately sample the genuine blurring movement data from the output of the sensor 6a.

Figure 14:
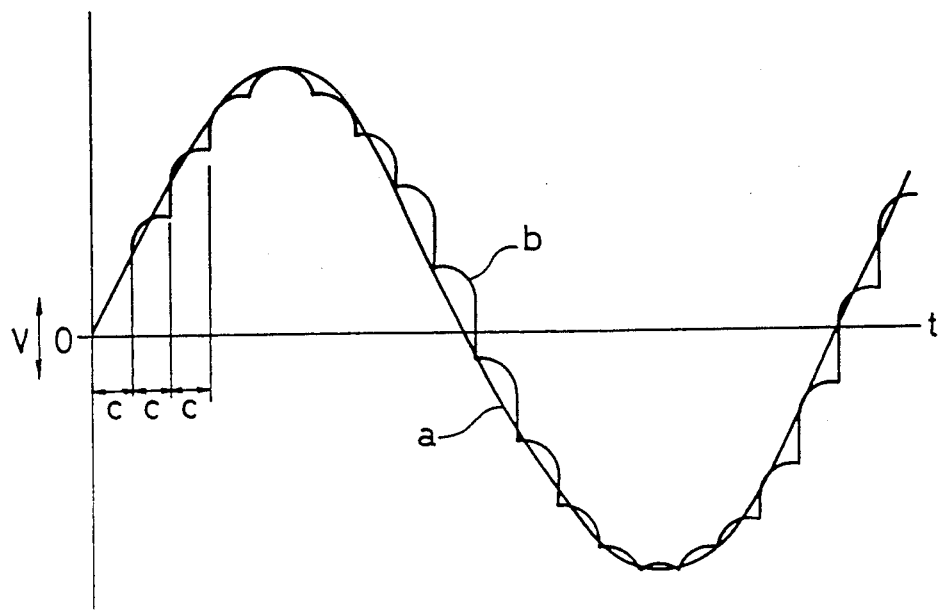
FIG. 14 is a graphical view of a wave-form representing the blur correcting state in accordance with the first embodiment of FIG. 8.

The calculation means 10 predictively calculates the correcting amount of movement of the camera due to the unintentional motion of hands on the basis of data $B_k$, $B_{k-1}$ and $V_{k-1}$. More concretely, in this particular embodiment, if the state of movement is represented by an approximate sine curve as illustrated in FIG. 14, by characteristic line (a), the movement correction characteristic curve following the movement of curve (a) is represented by line (b) in FIG. 14.

Figure 15:
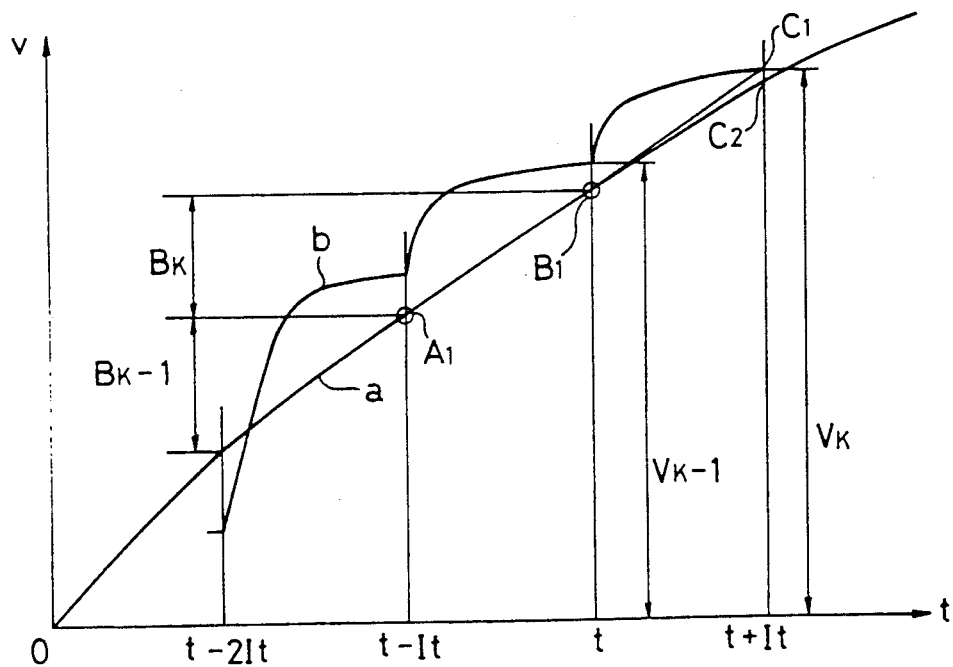
FIG. 15 is a partially enlarged view of the graph of FIG. 14.

More precisely, as illustrated by enlarged graph in FIG. 15, the velocity at the point C2 is predicted from the velocity data at the points B1 and A1 by linear approximation method wherein the timings of the points A1, B1 and C2 are represented by t-It, t and t+It, respectively, wherein (It) represents the integration time for one integration calculation.

It is to be noted that it is desirable that the points C1 and C2 be completely coincident to each other. However, a slight difference is inevitably generated between the points C1 and C2 since the predictive calculation is conducted on the basis of linear approximation while the actual velocity change is represented by the sine curve (a). However, the difference is practically negligible and no problem arises.

The data $V_k$ at the timing point t+It to be predicted is represented as follows.

$$V_k = f(V_{k-1}, B_k, B_{k-1})$$

or otherwise by $$V_k = V_{k-1} + 2B_k - B_{k-1}$$

Therefore, the data BLzp obtained in step S26 is converted to the data BL in the next step S27.

More concretely, such a conversion is conducted by the actuator drive circuit 14. The data BL is calculated in such a way that a plurality of the data $B_k$ output from the detection unit 6 are obtained first and that the predictive amount of movement correction at the timing of prediction point (which is the timing after the integration period (It) from each timing of the data $B_k$, in this particular embodiment) is calculated on the basis of the plurality of the data Bk. Therefore, the data BL corresponds to the amount of movement correction at the prediction point. Accordingly, to correct the movement at the prediction point, the data BLzp is converted to the data BL by reversing the phase of the data so that the movement of hands is canceled.

That is, in step S27, the data BLzp is converted to the data BL, then in step S28, the actuator 9 is driven to move the element 5 in the direction perpendicular to the optical axis (O) so that the movement is predictively corrected.

After that, in step S29, the shutter is opened. Then, in step S30, the sampling interval time (It) is subtracted from the shutter time period Ss. After that, in step S31, whether the subtracted time Ss is below zero or not is discriminated. If the discrimination result is NO, the sampling number k is incremented in step S32 so that the sampling operation is conducted again.

After that, steps S33 to S38 are conducted in a manner similar to the steps S19, S20, S25, S26, S27 and S28, mentioned above. In step S38, the movement correction actuator is driven. After that, the flow moves back to step S30. In step S30, the time Ss is obtained by subtracting the sampling interval time (It) from the shutter time. After that, in step S31, whether the time Ss is below zero or not is discriminated. If the discrimination result is NO, the steps S32 to S38 are repeated as mentioned above.

Steps S32 to S38 are repeated until the discrimination result in step S31 becomes YES, which means that the time Ss becomes larger than or equal to zero. This means that while the shutter is being opened, the predictive movement correction is repeatedly conducted on the basis of movement detection data.

If the discrimination result in step S31 becomes YES, the flow moves to step S39 wherein whether the shutter is closed or not is discriminated. If the discrimination result in step S39 is NO, the step S39 is conducted again, which means that the flow waits until the discrimination result becomes YES.

When the discrimination result becomes YES in step S39, the flow moves to step S40 wherein the actuator 9 is driven in the direction opposite to the movement correcting direction so that the actuator returns to the initial position.

After that, in step S41, the CPU 15 outputs an inhibit signal (I) so that the function of the actuator drive circuit 14 is stopped and the actuator 9 is deenergized and stopped, accordingly.

After that, in step S42, in a similar manner to the case of step S41 mentioned above, the CPU 15 outputs the inhibit signal (I) to stop the operation of the sampling circuit 6c of the unit 6 so that the sampling operation is stopped.

After that, the flow moves to step S43 wherein the film is advanced and the shutter charge operation is conducted for the next photographing process.

Thereby, a series of the function of the first sequence group is ended.

On the other hand, the function of the second sequence group is as follows.

Figure 11I:
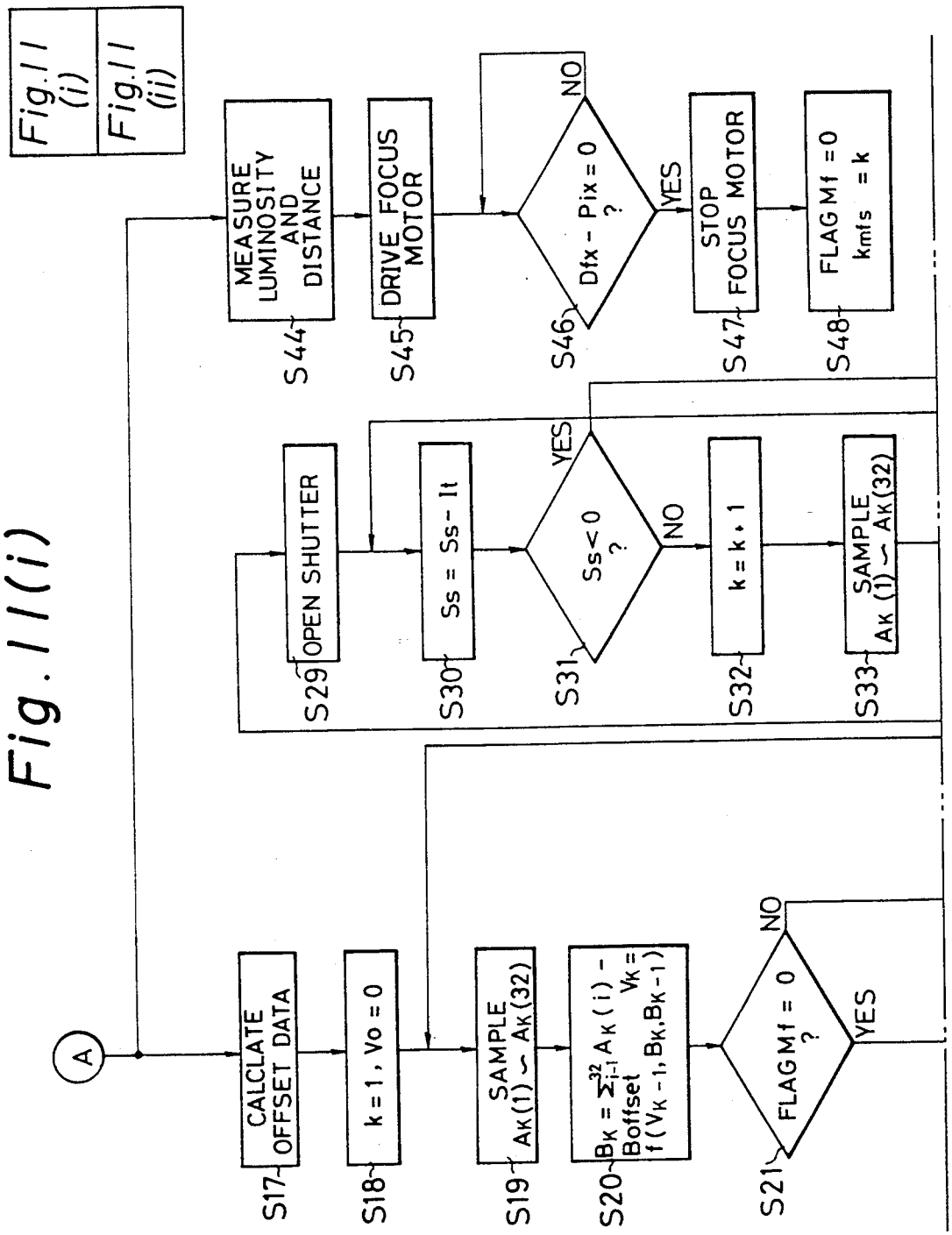

When the flag Mf becomes "1" in step S8 of FIG. 9, the flow moves to step S44 of FIG. 11 wherein the circuit 20 starts the luminosity measuring operation under the control of the CPU 15 upon the receipt of a command signal from the CPU 15. The shutter speed and the value of aperture are determined in response to the adequate exposure value obtained on the basis of the measurement result of luminosity.

Simultaneously with the above mentioned function in step S44, the circuit 16 is actuated by the command from the CPU 15 and conducts the distance measurement operation under the control of the CPU 15. The distance data Dx obtained in this measurement operation is converted to the focus data Dfx by the circuit 17.

After that, the flow moves to step S45 wherein the focusing operation is conducted on the basis of the focus data Dfx.

After that, the flow moves to step S46 wherein whether Dfx−Pix=0 or not is discriminated. More precisely, this step is to discriminate whether the focus data Dfx which corresponds to the step number of the motor 7 necessitated for actual focusing motion and the accumulated step number data Pix generated from the photointerrupter 18 each time the motor 7 is driven by one step are equal to each other or not. That is, whether or not the motor 7 has been yet driven by the step number needed to complete the focus motion is discriminated in this step S46.

If the discrimination result is NO in step S46, the motor 7 is continued to be driven step by step until the step number becomes equal to the number needed to achieve the focus motion.

When the discrimination result becomes YES in step S46, the flow moves to step S47 wherein the motor 7 is stopped.

After that, in step S48, the motor flag Mf is turned to "0" which represents that the motor 7 is being stopped. Also, at the same time, the value of k at the time of ending the AF operation is set in k as $k_{mfs}$ so that the above mentioned process of the first sequence group is conducted in parallel together for preparation for the blurring movement correction and film exposure.

Therefore, in accordance with the first embodiment mentioned above, the unintentional movement of the camera body is detected at a predetermined time interval (sampling interval It) so that the movement is predictively calculated on the basis of data $B_k$, $B_{k-1}$ and $V_{k-1}$ in such a way that the unintentional vibration movement is assumed to be of approximate sine curve as represented by the characteristic curve (a) in FIGS. 14 and 15 and that the movement amount at the timing point (t+It) is predictively calculated on the basis of the data at the timing points (t) and (t-It) by a linear approximation method, which makes it possible to predict the movement amount and correct or cancel the movement.

Figure 16:
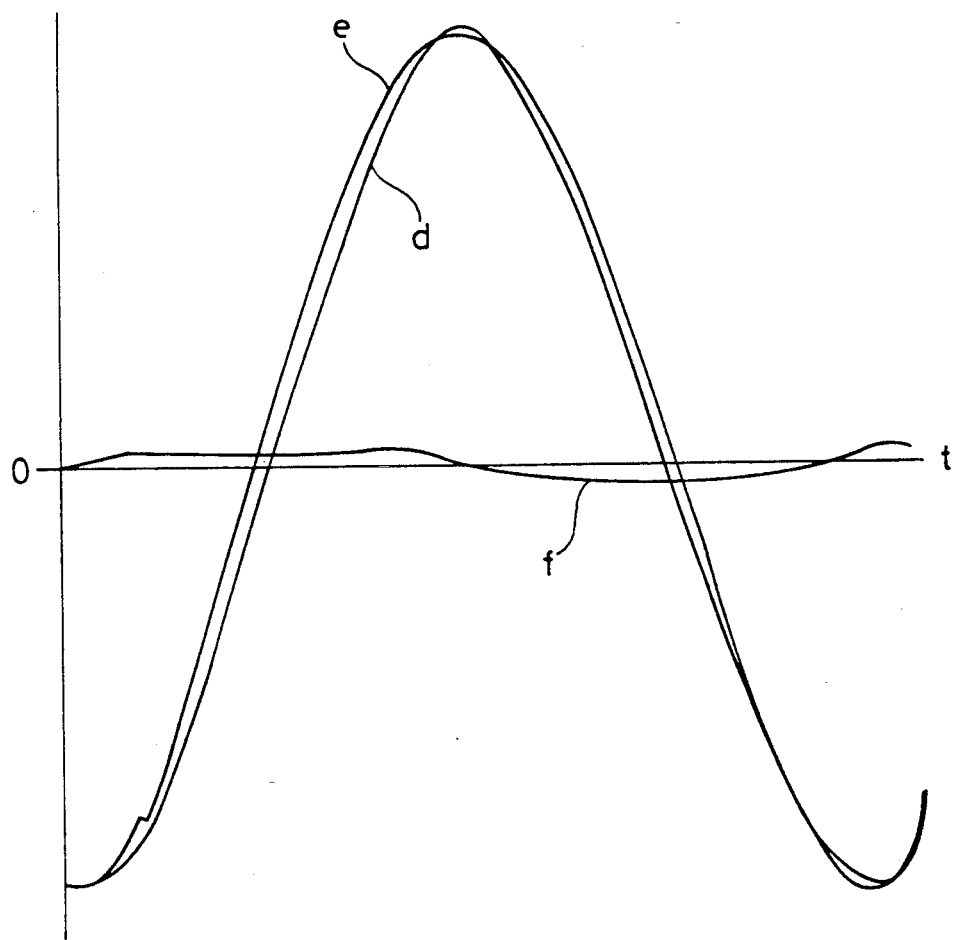
FIG. 16 is a graphical view representing a blurring motion amount after the blurring motion is corrected in accordance with the first embodiment of FIG. 8.

Therefore, with respect to the image motion on the film surface, the sine curve of the correcting amount characteristic (d) becomes almost equal to the movement characteristic (e), as illustrated in FIG. 16, so that there is very slight deficiency of correction amount as represented by the characteristic line (f) which is practically negligible and involves in no problems in actual operation.

Besides, in accordance with the arrangement mentioned above, only the blurring movement component signal included in the output of the sensor 6a is input to the sampling circuit 6c, which makes it possible to avoid impairing the correcting function due to the noise generated at the time of intermittent operation of the actuator 9.

In accordance with the above mentioned arrangement, it is possible not only to remove components of noise caused by the intermittent operation of the actuator but also to remove the noise caused by other than intermittent operation as well.

In accordance with the embodiment of the present invention mentioned above, the predictive movement calculation to cancel the unintentional movement of camera is conducted on the basis of three data, that is, the movement changing amount data $B_k$ of this time, the movement changing amount data $B_{k-1}$ of the preceding time and the velocity data $V_{k-1}$ of the camera motion of the preceding time, as a result of which it becomes possible to accurately follow the actual unintentional motion of the camera and correct the motion accordingly.

Next, the second embodiment of the present invention is described hereinafter. This embodiment is adequately applied to the case where the correction condition is more severe such as the case wherein a telescopic lens having a relatively long focal length is used so that the movement has to be corrected more reliably and accurately.

The second embodiment is described below with reference to FIGS. 17 to 21.

FIG. 17 illustrates the circuit structure of the second embodiment of the present invention. The structure of FIG. 17 differs from the structure of FIG. 8 only in that the arrangement of the calculation means 30, memory means 31 and the noise removing circuit 32 are different from those of FIG. 8. The same or corresponding parts are designated by the same numerals as the embodiment of FIG. 8.

The essential structure of the means 30 is constituted from a first calculation circuit 30a, a second calculation circuit 30b and a third calculation circuit 30c connected together in series in this order. The memory means 31 comprises a first memory 31a, a second memory 31b and a third memory 31c.

The first circuit 30a is arranged to obtain $V_k = f(V_{k-1}, B_k, B_{k-1}, B_{k-2})$ wherein $V_k$: camera motion velocity data of this time of operation $V_{k-1}$: camera motion velocity data of preceding time of operation $B_k$: movement changing amount data of this time of operation $B_{k-1}$: movement changing amount data of preceding time of operation $B_{k-2}$: movement changing amount data of preceding time of preceding time.

The second circuit 30b and the third circuit 30c are substantially the same as the second circuit 10b and the third circuit 10c of the first embodiment of FIG. 8, respectively.

On the other hand, to the input terminal of the memory 31a is connected an output terminal of the sampling circuit 6c of the detection unit 6. The output terminal of the memory 31a is connected to the input terminal of the circuit 30a.

Further, the output terminal of the memory 31a is connected to the input terminal of the memory 31b. The output terminal of the memory 31b is connected to the input terminal of the circuit 30a. Also, to the input terminal of the third memory 31c is connected the output terminal of the first circuit 30a. The output terminal of the memory 31c is connected to the input terminal of the input terminal of the circuit 30a.

Also, the noise removing circuit 32 is disposed between the blurring movement detection sensor 6a and the sampling circuit 6c for the same purpose as the noise removing circuit 6b of the first embodiment mentioned above.

It is to be noted that the circuit 6b of the first embodiment is constituted from a low-pass filter means. However, in the second embodiment of the present invention, the noise removing circuit 32 comprises, instead of the low-pass filter means, a control means which is synchronized with the drive signal transmitted to the actuator 9 which is the intermittent drive means and which control means prefixingly holds the output from the sensor 6a transmitted in a predetermined period after the time when the intermittent operation is started in response to the drive signal.

Also, a noise removing signal S is transmitted to the noise removing circuit 32 and the sampling circuit 6c.

The blurring movement correcting function of the above mentioned structure of the second embodiment of the present invention is described below.

Figure 18:
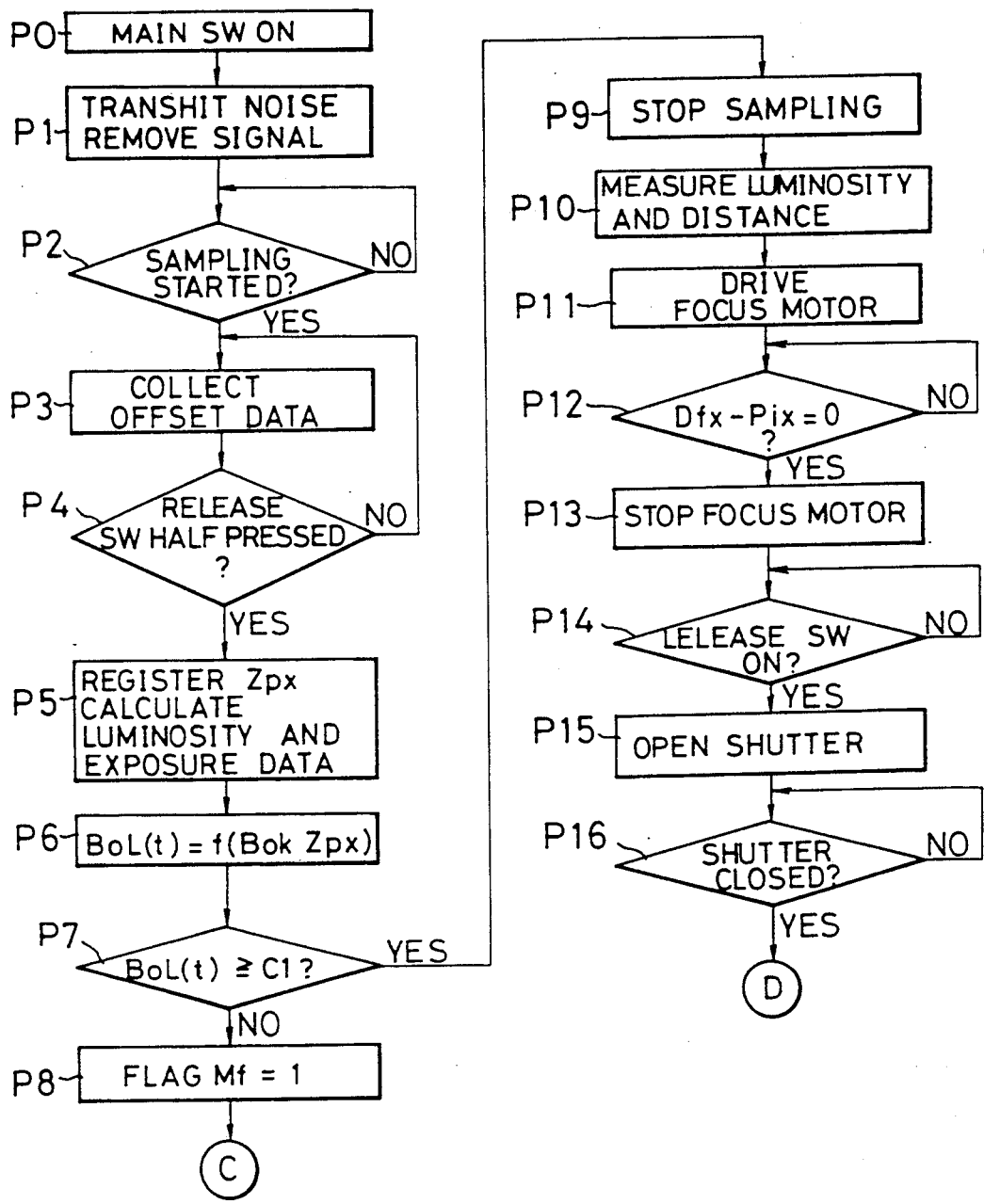
FIG. 18 is a flow chart of the function of the second embodiment of FIG. 17.

FIGS. 18 and 20 illustrate flow charts of the function of the second embodiment of the present invention. There are many steps which are the same as those of the first embodiment represented in the flow charts of FIGS. 9 and 11. Therefore, only the steps which are different from those of the first embodiment are described hereinafter for the sake of clarifying the explanation.

In step P0 of the flow chart illustrated in FIG. 18, when the main switch is turned on, the power is supplied to each part of the circuit assembly and a predetermined program memorized in the memory 26 is executed so that each part is initialized first.

Figure 19:
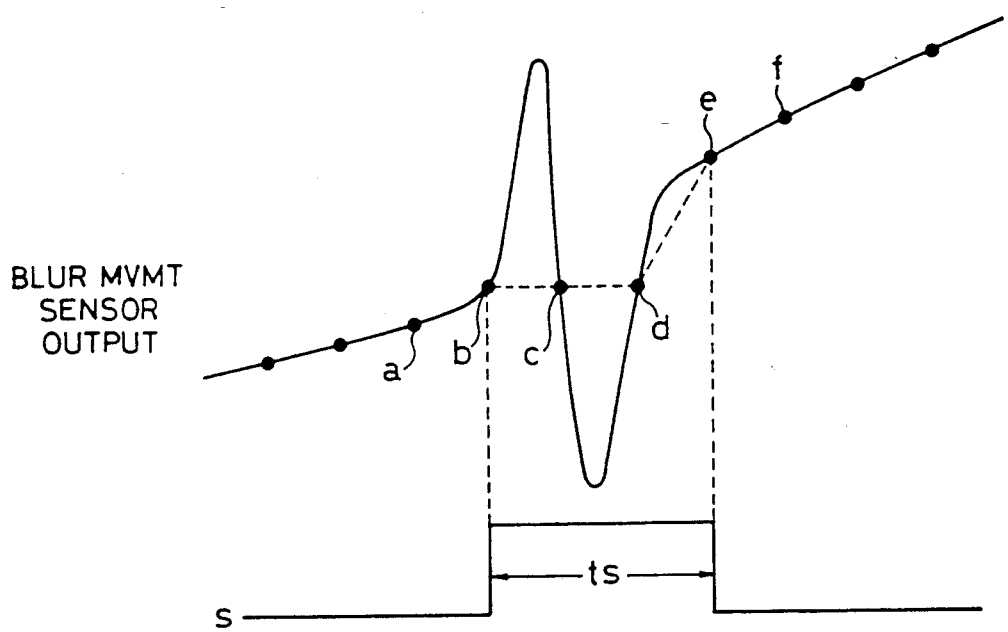
FIG. 19 is an explanatory view for explaining the noise removing function in accordance with the second embodiment of FIG. 17.

After that, in step P1, the CPU 15 transmits th noise removing signal S to the noise removing circuit 32. The signal S is kept being "H" level for a predetermined time period (ts) from the timing point when the intermittent drive by the actuator 9 is started, as illustrated in FIG. 19. The time period (ts) is synchronized with the intermittent drive signal input to the actuator 9.

This arrangement of the second embodiment of the present invention appropriately copes with the case where a spike noise component which is synchronized with the intermittent drive as illustrated in FIG. 19 is superposed on the output signal of the sensor 6a. That is, in such a case, the sampling process is conducted in such a way that a data is sampled at a point (a) first, after that, a data at the point (b) which is the starting point of the period (ts) for the noise removing signal S is prefixingly held at the points (c) and (d) in the period (ts) and that the output data from the sensor 6a are sampled at the point (e) which is the terminal point of the period (ts) and subsequent points (f) . . . .

In FIGS. 18 and 20, steps P2 to P19 and steps P44 to P48 are substantially the same as steps S2 to S19 and steps S44 to S48. Therefore, after steps P2 to P19 are conducted in the same manner as the first embodiment mentioned above, the flow moves to step P20.

In step P20, the movement change amount data $B_k$ and the velocity data $V_k$ of the camera motion is obtained by the sampling circuit 6c using the following equation.

$$B_k = \sum_{i=1}^{32} A_k(i) - B\text{offset}$$

Also, the data $V_k$ is calculated by the circuit 30a from the following equation.

$$V_k = f(V_{k-1}, B_k, B_{k-1}, B_{k-2})$$

More precisely, the data $V_k$ of this time of operation is calculated on the basis of the data $B_k$ of this time of operation. The data $B_k$ of this time is registered in the first memory 31a. Also, the data $V_k$ is registered in the third memory 31c. The data Bk registered in the memory 31a is, when the data $B_k$ of next time is transmitted from the sampling circuit 6c to the calculation circuit 30a, input to the memory 31b from the memory 31a as the data $B_{k-1}$ of the preceding time. The data $B_k$ of this time is also input to the calculation circuit 30a as well.

Also, the data $B_{k-1}$ of preceding time registered in the memory 31b is input to the circuit 30a from the memory 31b as the data $B_{k-2}$ of preceding time of preceding operation when the data Bk is transmitted to the circuit 30a from the sampling circuit 6c.

Further, the data $V_k$ of this time registered in the memory 31c is input to the circuit 30a from the memory 31c as the data $V_{k-1}$ of preceding time when the data $B_k$ for the next time is transmitted from the sampling circuit 6b to the calculation circuit 30a. Therefore, it becomes possible to calculate the data $V_k = f(V_{k-1}, B_k, B_{k-1}, B_{k-2})$.

After that, in step P21, whether the focus flag Mf is being "0", which means the focus motor 7 is being stopped, or not is discriminated. The sequence of function of this step P21 and the series of steps P22 to P33 following to step P21 is the same as the sequence of function of steps S21 to S33 of the first embodiment mentioned above referring to FIG. 11.

After step P33 is ended, the flow moves to step P34 wherein the operation is conducted in the same way as the above mentioned step P20. After that, steps P35 to P38 are conducted in substantially the same manner as steps P25 to P28.

On the other hand, the discrimination result of "Ss<0?" in step P31 becomes YES, the flow moves to step P39 wherein whether the shutter is being closed or not is discriminated. If the discrimination result in step P39 is NO, the flow repeats the step P39 so that the flow waits until the discrimination result becomes YES. When the discrimination result becomes YES, the flow moves to step P40.

In step P40, the blurring movement correcting actuator 9 is driven to move to the direction opposite to the direction for correcting the blurring movement, that is, the actuator 9 returns to the initial position.

After that, in step P41, the CPU 15 outputs an inhibit signal (I) to stop the function of the drive circuit 14 so that the actuator 9 is stopped.

After that, in step P42, as in the case of step S42 of FIG. 11 mentioned before, the function of the sampling circuit 6c of the movement detection unit 6 is stopped by the inhibit signal (I) transmitted from the CPU 15.

After that, the flow moves to step P43 wherein the film is advanced and the shutter charge operation is conducted for preparation for the next photographing process. Thereby, a series of blurring movement prediction and correction sequence is ended in the first sequence group of steps.

On the other hand, with respect to the function of the second sequence group of steps, steps P9 to P16 are conducted in substantially the same way as the aforementioned steps S9 to S16 of the first embodiment of the present invention.

Figure 21:
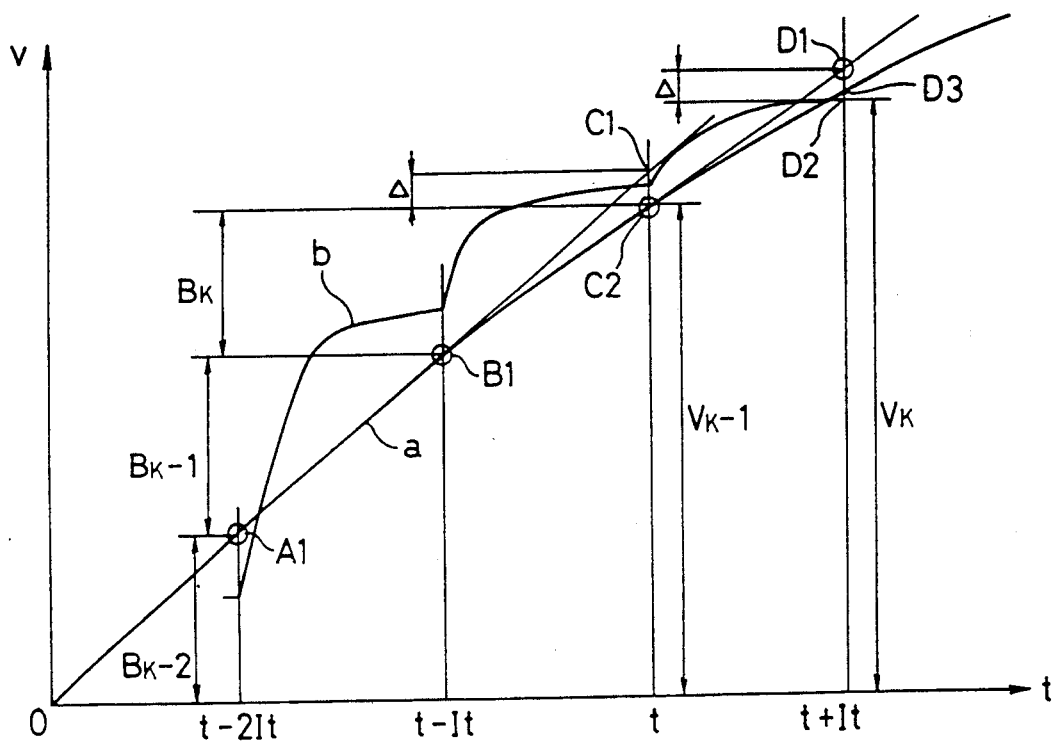
FIG. 21 is an explanatory view for explaining the blurring movement correcting state in accordance with the second embodiment of FIG. 17.

Therefore, in accordance with the second embodiment of the present invention, the blurring movement is predictively calculated in such a way that the unintentional movement of hands is detected at a predetermined time interval (sampling interval (It)) and that the predictive amount of movement is calculated on the basis of four data, that is, $B_k$, $B_{k-1}$, $B_{k-2}$ and $V_{k-1}$. If the blurring vibration movement is represented approximately by a sine curve characteristic (a) as illustrated in FIG. 21, the movement correction characteristic curve which follows the actual movement is represented by the line (b) in FIG. 21.

The velocity of the movement at the point D3 at the timing point $(t+It)$, that is, the timing after time (It) as elapsed from the time (t) now is predictively calculated with the use of curve approximation method on the basis of the velocity data at the point C2 at the time (t) now, the velocity data at the point B1 at the timing (t-It), and the velocity data at the point A1 at the timing (t-2It).

That is, the velocity C1 at the timing (t) is obtained from the data at the timing points (t-2It) and (t-It). The difference $\Delta$ between the velocity C1 and the actual velocity (velocity at the point C2) is represented as $$\Delta = B_{k-1} - B_k.$$

In other words, the data at the point D1 is obtained from the data at the points B1 and C2. The value of $\Delta$ is subtracted from the data at the point D1 to calculate the data at the point D2. This data at the point D2 is supposed to be the predictive velocity data at the timing point $(t+It)$ after time (It) has elapsed from the time (t) now. This is represented by the equations as follows.

$$V_k = f(V_{k-1}, B_k, B_{k-1}, B_{k-2})$$

or otherwise, $$V_k = V_{k-1} + 3B_k - 3B_{k-1} + B_{k-2}$$

That is, the data $V_{k-1}$ at the timing point (t-It) and the data at the timing points (t-It) and (t-2It) are temporarily registered in the memories 31a and 31b. The data $V_k$ is calculated from the registered data and the data $B_k$ at the timing point (t). And on the basis of the data $V_k$, the data $B_k$ at the timing point $(t+It)$ is predictively calculated by the so called curve approximation method.

Therefore, in accordance with the second embodiment of the present invention mentioned above, the blurring movement can be corrected more accurately and at a higher speed than in the case of the first embodiment, which makes it possible to use a telescopic lens attached to the hand-held camera to take a telescopic photograph, which has been supposed to be impossible in accordance with the prior art.

Besides, in accordance with the embodiments of the present invention, the noise components included in the output from the sensor 6a are removed synchronizing with the intermittent drive of the actuator 9 so that the noise caused by the intermittent operation is almost completely removed, which makes it possible to obtain a very accurate blurring movement data so that the blurring motion is accurately corrected precisely in response to the actual unintentional movement of hands holding the camera.

The present invention is not limited to the embodiments mentioned above. The present invention can be applied to various variants of the embodiment within the scope of the invention.

For example, the blurring movement correction element may be constituted from a wedge shaped prism disposed perpendicular to the optical axis so that the prism is vertically moved to correct the blurring movement of the camera.

Also, in accordance with the embodiments of the present invention, a plurality of data are used for predicting the velocity of the blurring movement. That is, in the first embodiment, data at two timing points are used to calculate the predictive movement while in the second embodiment, data at three timing points are used to calculate the predictive movement. The number of the timing points for obtaining the data to be used for predictive calculation may be determined considering the interval between measurements, required accuracy for correcting the blurring movement, and cost for producing the camera, etc.

Also, in accordance with the first and second embodiments of the present invention mentioned above, the blurring movement is detected in such a way that the acceleration generated in the camera body is detected and integrated for a predetermined integration time by the sensor 6a composed of a semiconductor acceleration sensor and a sampling circuit 6c. However, the present invention is not limited to such an arrangement. A gyro-type acceleration sensor may be used instead. That is, any means which is able to output an electric signal corresponding to the movement of the camera body can be adopted as the blurring movement detection means.

Also, it should be understood that any means for removing the noise can be adopted instead of the low-pass filter type noise removing circuit 6b used in the arrangement of the first embodiment mentioned above or the noise removing circuit 32 used in the second embodiment wherein the data is prefixingly held in the memory means synchronizing with the intermittent drive operation of the actuator 9.

Figure 22:
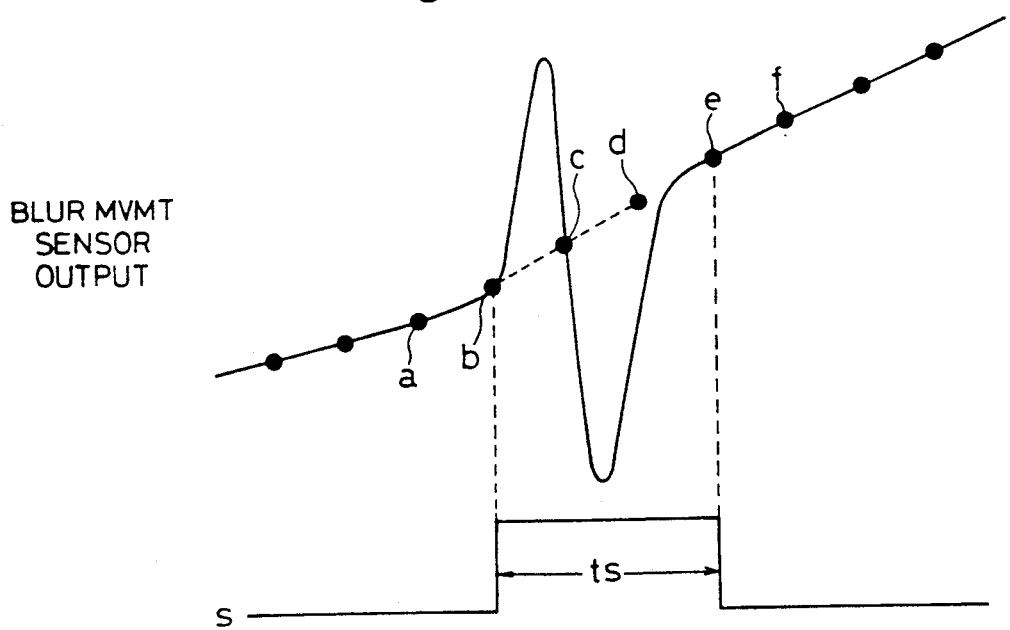
FIG. 22 is a graphical view of a wave-form for explaining another example of noise removing function in accordance with the present invention.

For example, FIG. 22 represents another way of sampling data from the output signal of the blurring movement sensor. The graph of FIG. 22 represents an output signal of the blurring movement detection sensor in which a spike component is included synchronizing with the intermittent operation. In this case, data is sampled at the point (a) and after that, data is sampled at the point (b) which is the starting point of the period (ts) for the noise removing signal S. The inclination value of the line spanning between the points (a) and (b) is calculated from the data of the points (a) and (b) so that the values at the subsequent points (c) and (d) within the period (ts) are predicted on the basis of the inclination calculated as mentioned above. Also, the data at the point (e) which is the ending point of the period (ts) and the subsequent sampling point (f) and the points following the point (f) are predicted. Or otherwise, the data of the points (e), (f) and subsequent points may be sampled from the original output signal from the sensor.

Also, an arrangement may be made in such a way that an average data for the period (ts) is calculated from the data of the starting point and the data of the ending point of the period (ts).

It is to be noted that although the cut off frequency of the noise removing circuit 6b is set as several 10 KHz in the first embodiment mentioned above, the cut off frequency is not limited to that value. The value of the cut off frequency is a design choice determined on the basis of a certain value specified according to the shape and/or weight of the camera.

It is also to be noted that although the period (ts) for the noise removing signal S in the second embodiment is arranged from the starting point of the intermittent drive source (blurring movement correcting actuator 9) to the ending point of the drive source, it may be possible to arrange the period (ts) to start at a timing point slightly before the starting point of the intermittent drive operation and end at a timing point slightly after the ending point of the intermittent drive operation for the sake of raising the reliability of data sampling operation.

Also, the present invention can be applied not only to the camera equipped with a zoom lens as the photographing lens as in the case of the first and second embodiments but to the camera equipped with a fixed focal length lens as well.

Also, the blurring movement correction optical element may be formed as a part of or whole of the focusing lens system or the zoom lens system. Also, the focus lens system and the zoom lens system may be assembled together instead of being arranged independently.

Also, it is design choice to correct the blurring movement correction amount according to the length to the subject or the focal length.

Many widely different embodiments of the present invention may be constructed without departing from the spirit and scope of the present invention. It should be understood that the present invention is not limited to the specific embodiments described in the specification, except as defined in the appended claims.

What is claimed is:

1. A camera having blurring movement correction mechanism, comprising:
    a blurring movement correction optical element disposed in an optical path of a photo-taking optical system so as to correct shift of an image formed on a film surface caused by movement of hands holding a camera body;
    a blurring movement detection unit for obtaining a blurring movement detection data by converting a blurring movement of said camera body to an electric signal;
    a calculation means for calculating blurring movement correction data for correcting said shift of the image formed on the film surface caused by said movement of hands holding the camera body;
    a blurring movement correction actuator for moving said optical element in a necessary direction in order to correct said shift of the image on the film surface on the basis of said blurring movement correction data obtained from said calculation means; and
    a noise removing means for removing transition output components included in said blurring movement detection data obtained from said detection unit, said transition output components comprising noise signals of high frequency generated at the time when said blurring movement correction actuator is driven.

2. A camera having blurring movement correction mechanism according to claim 1, wherein said actuator is arranged to be driven intermittently and wherein said camera further comprises a control means for prefixingly holding said output data of said detection unit within a predetermined period from a starting time of the intermittent drive of said actuator by said drive signal in synchronization with a drive signal transmitted to said unit.

3. A camera having blurring movement correction mechanism according to claim 2, wherein said control means is arranged in such a way that the control means is synchronized with said drive signal and averages the output data of said detection unit included within a period from a starting time of the intermittent drive operation by said drive signal to a time when a predetermined time is elapsed.

4. A camera having blurring movement correction mechanism according to claim 2, wherein said control means is arranged in such a way that the control means is synchronized with said drive signal and predicts the output of said detection unit at a time when a predetermined time is elapsed from the starting time of said intermittent drive operation on the basis of the data at a time immediately before the starting time of said intermittent drive operation.

5. A camera having blurring movement correction mechanism according to claim 1, wherein said noise removing means comprises a low pass filter for removing transition output components of several KHz to several 10 KHz generated at the time when said blurring movement correction actuator is driven.

* * * * *